United States Patent
Altheimer et al.

[11] Patent Number: 5,880,810
[45] Date of Patent: Mar. 9, 1999

[54] SERIES FOR PROGRESSIVE SPECTACLE LENSES

[75] Inventors: Helmut Altheimer, Baiswell; Rudolf Barth, Vierkirchen; Peter Baumbach, Munich; Jochen Brosig, Grunwald; Gregor Esser, Haar; Gunther Guilino, Munich; Christine Meixner, Munich; Herbert Pfeiffer, Munich; Manfred Rohrbach, Hebertshausen, all of Germany

[73] Assignee: Optische Werke G. Rodenstock, Munich, Germany

[21] Appl. No.: 663,111
[22] PCT Filed: Oct. 28, 1995
[86] PCT No.: PCT/DE95/01499
§ 371 Date: Jun. 28, 1996
§ 102(e) Date: Jun. 28, 1996
[87] PCT Pub. No.: WO96/13748
PCT Pub. Date: May 9, 1996

[30] Foreign Application Priority Data

Oct. 29, 1994 [DE] Germany .......... 44 38 506.4
Mar. 30, 1995 [DE] Germany .......... 195 11 613.5

[51] Int. Cl.⁶ .................................................. G02C 7/06
[52] U.S. Cl. .................................... 351/169; 351/176
[58] Field of Search ........................ 351/169, 176

[56] References Cited

U.S. PATENT DOCUMENTS 3,910,691 10/1975 Maitenaz .................. 351/169
5,444,503 8/1995 Kelch ........................ 351/169

FOREIGN PATENT DOCUMENTS 0039497 11/1981 European Pat. Off. .
WOA85 02689 6/1985 WIPO .
WOA91 01508 2/1991 WIPO .

*Primary Examiner*—Georgia Epps
*Assistant Examiner*—Jordan M. Schwartz
*Attorney, Agent, or Firm*—Antonelli, Terry, Stout & Kraus, LLP

[57] ABSTRACT

A series of progressive ophthalmic lenses, each having a varying surface power in a distance part and/or a varying increase in surface power from a distance part to a near part, includes a front surface having a continuously varying surface power and an eye-facing surface, principal sections of which have varying powers and at least one of which deviates from a circular form. The lenses have astigmatic power and are distinguished by a deviation (dz) between an apex circle and a sagitta of each principal section, as given by the equation:

$$dz = a_j \ast r^2 + b_j \ast r^4$$

with coefficients $$|a_j| \leq 2 \ast 10^{-4} \text{ mm}^{-1}$$

$$|b_j| \leq 1 \ast 10^{-6} \text{ mm}^{-3}$$

and where coefficients $a_{j2}$ and $b_{j2}$ are yielded by the following functionals:

$$a_j = f_{j1}(sph, zyl) = a_{j1}(sph) + b_{j1}(sph) \ast zyl$$

$$b_j = f_{j2}(sph, zyl) = a_{j2}(sph) + b_{j2}(sph) \ast zyl$$

with coefficients $a_{j2}$ and $b_{j2}$ being a function of a second order.

14 Claims, 23 Drawing Sheets

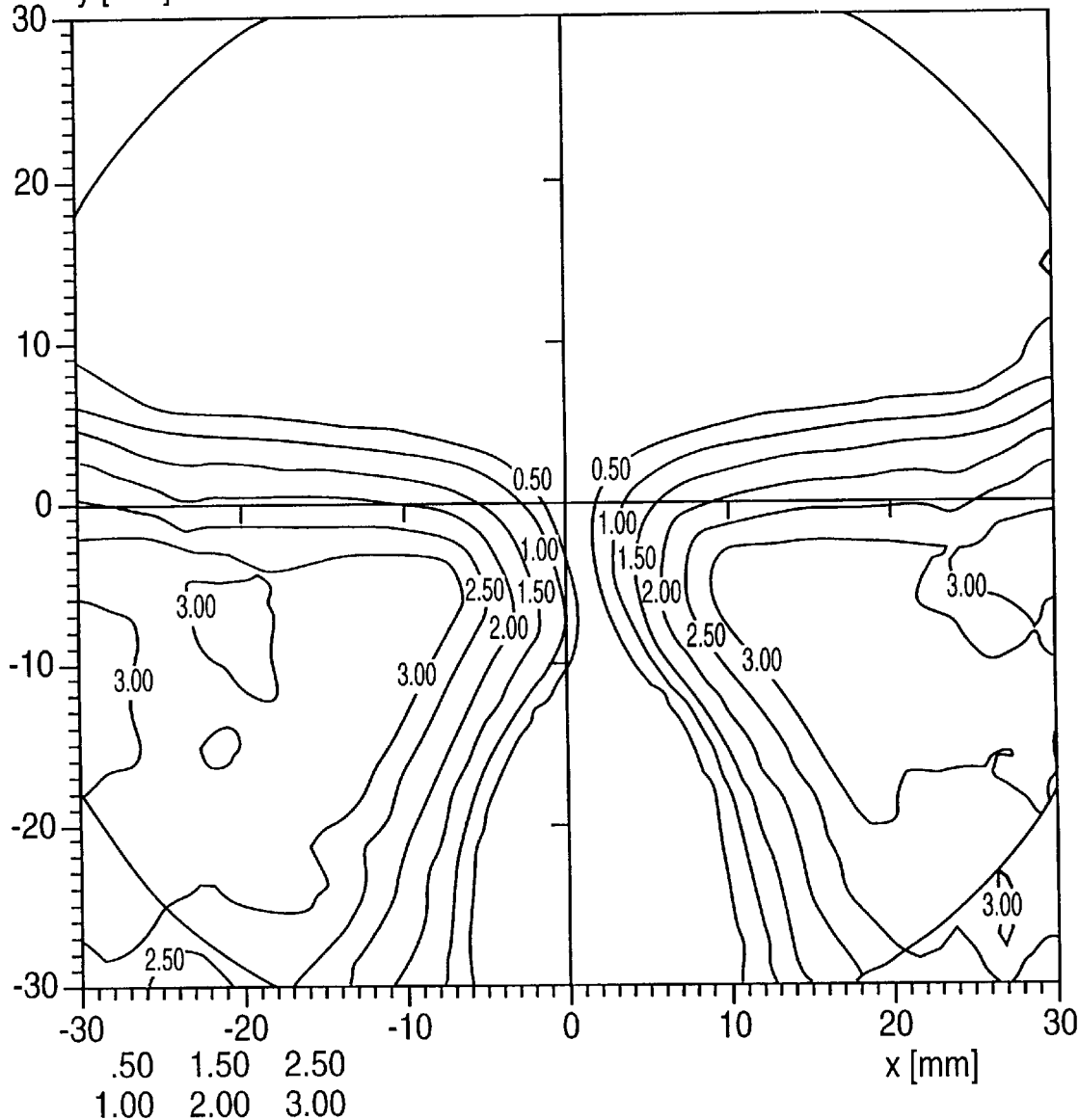

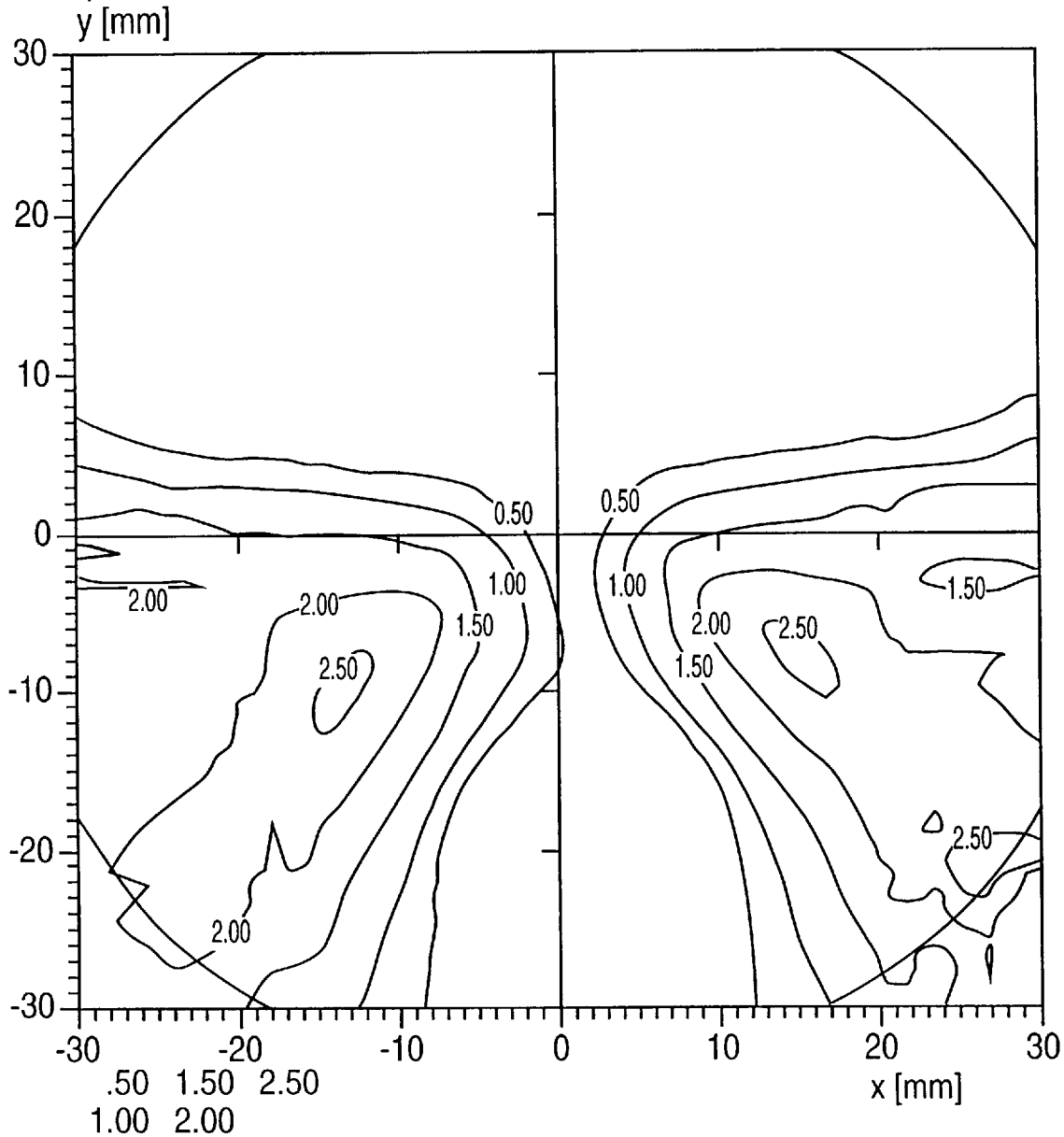

FIG. 2c

SURFACE PROPERTIES TERMED   n=1.604   ASTIGMATISM [dpt]
BASIS CURVE 5

Sph = 0.50      Add = 3.00    n = 1.604    drpr = 2.00

.50   1.50   2.50
1.00   2.00   3.00

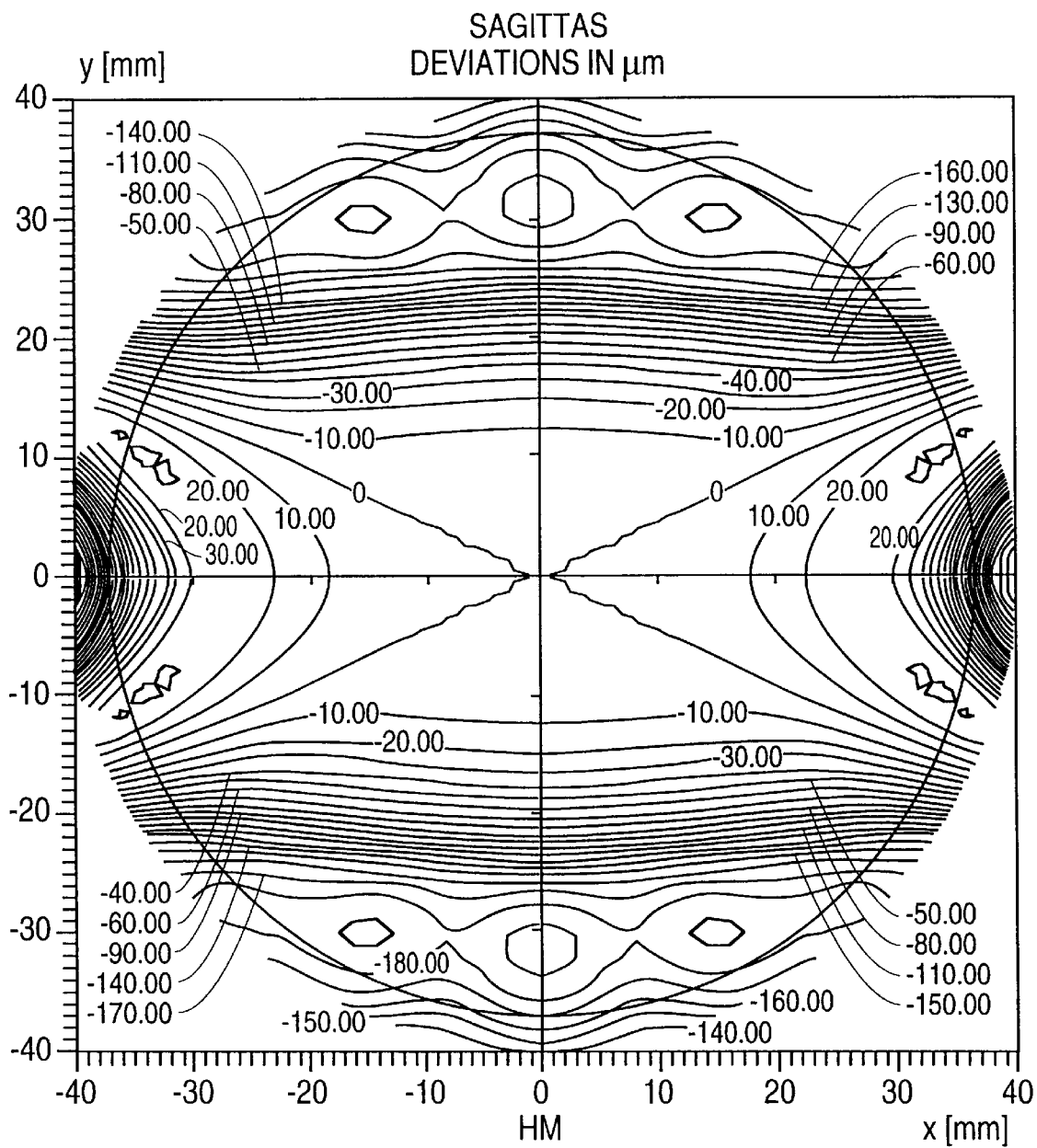

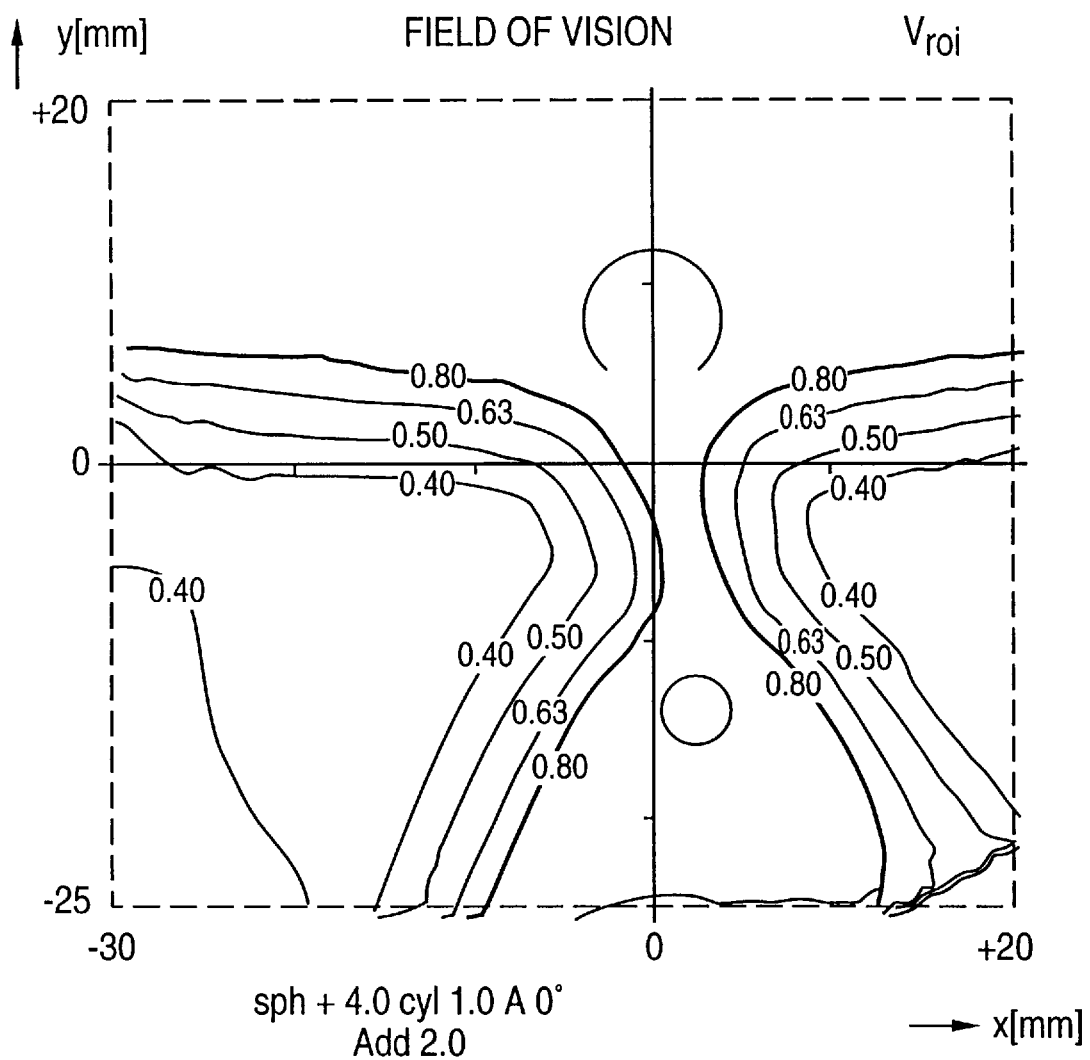

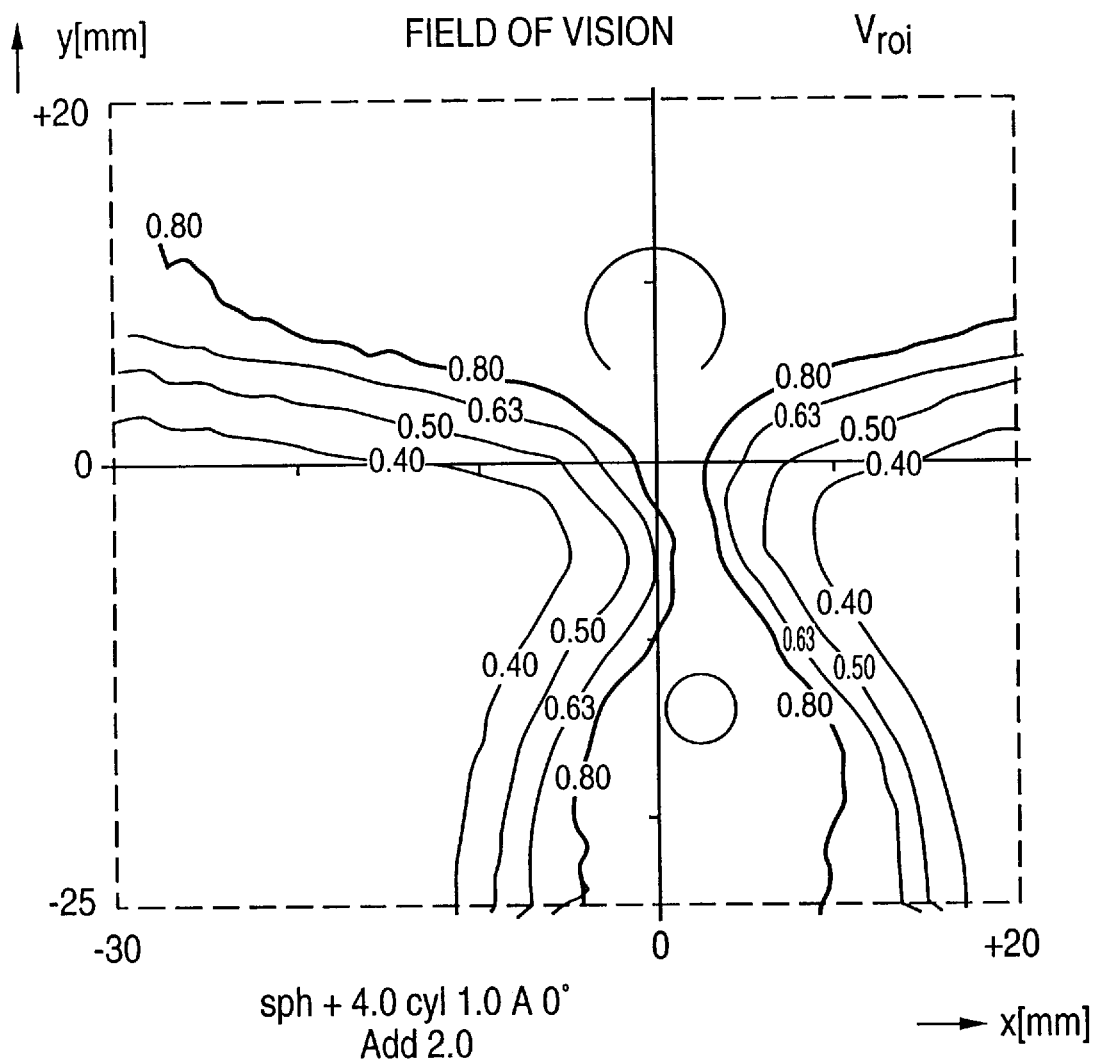

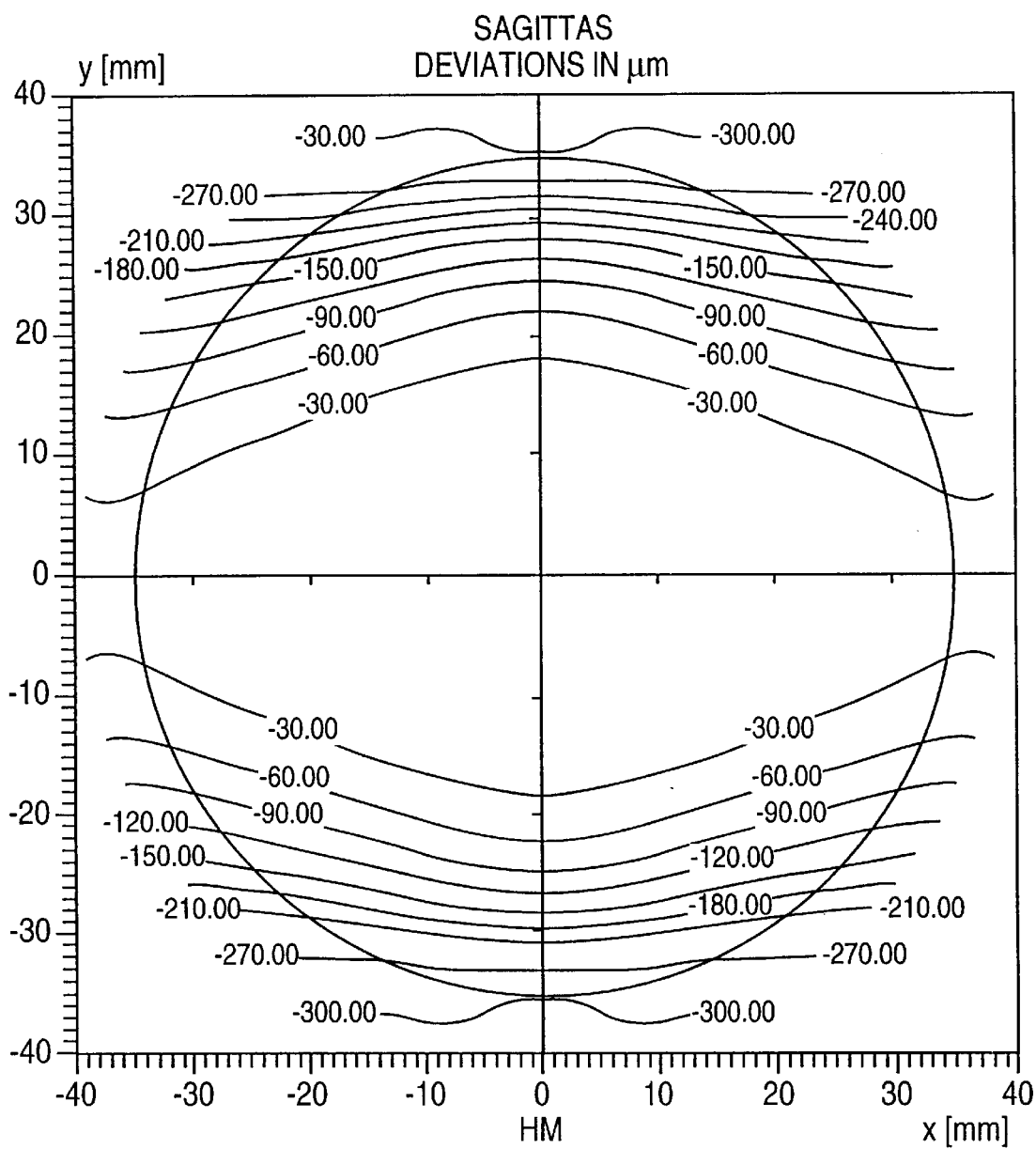

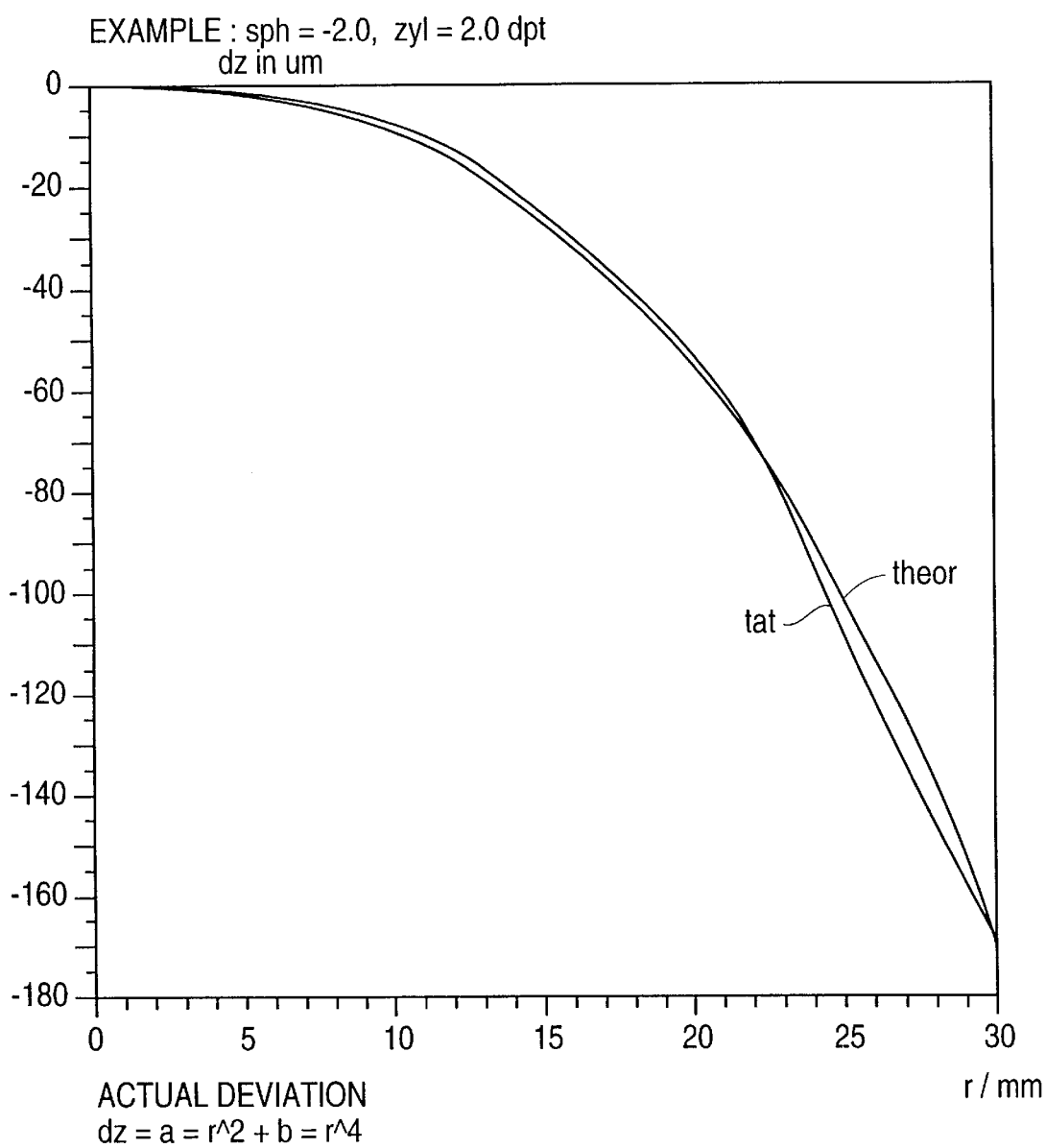

SERIES FOR PROGRESSIVE SPECTACLE LENSES

TECHNICAL FIELD

The present invention relates to a series of ophthalmic lenses.

STATE OF THE ART

Ophthalmic lenses of the type which are provided (usually) with a front surface having a continuously varying surface power (progressive surface), which rises from the respective value BK [dpt] suited for seeing in the distance in the point having (within the scope of the present application) the coordinates x=0 mm, y=8 mm (distance reference point) in the lower region of the distance part along a curved line (principle line), which approximately coincides with the principal line of vision when lowering the glance, i.e. the piercing point of the viewing beam when lowering the glance through the surface having continuously varying power, to a value suited for seeing near in the upper region of the near part, which, in the near reference point, is higher by the value Add (dpt) of the addition than the surface power BK in the lower region of the distance part. The surface facing the eye is designed for fulfilling the astigmatic prescription atorically.

Manufacturers of progressive ophthalmic lenses have to fabricate this type of progressive ophthalmic lenses having varying surface power in the distance reference point and/or a varying increase in surface power from the distance part to the near part (hereinafter referred to as addition Add) as well as having varying astigmatic power and axial positions in order to meet the requirements of varying vision errors respectively varying degrees of long-sightedness of old age. Due to the variety of materials (silicate glass having a refractive index of 1.525, high index silicate glass having a refractive index of, e.g., 1.6 or 1.7 as well as plastic) and a multiplicity of basis curves and additions (usually from 0.5 dpt to 3.5 or 4 dpt in gradations of typically 0.25 dpt), it is necessary to calculate and to fabricate typically at least 100, usually however far more different surfaces for a "complete program".

In the past, this type of ophthalmic lenses having varying surface power in the distance part and/or a varying increase in the surface power from the distance part to the near part were calculated by first having calculated a progressive surface having a specific surface power and a specific addition, also referred to as near addition. From this surface, the other surfaces having deviating addition power respectively a deviating surface power needed for the series are derived by means of a transformation procedure. With regard to this, reference is made to U.S. Pat. No. 2,878,721 in which this is expressly mentioned. For the explanation of all terms, such as surface power and surface astigmatism, not individually defined herein reference is explicitly made to this printed publication as well as to DE-A-28 14 936.

For some time, progressive surfaces have been calculated separately for each surface power in the distance reference point and for each addition, by way of illustration by means of splines, thus not derived from a so-called parent surface by means of transformation procedures. The atoric surface, depending on the progressive opposite surface and the axial position, i.e., also the orientation to the progressive opposite surface, is also calculated separately.

In these calculation procedures, "objective functions" in which the surface properties prescribed from physiological considerations are used. Therefore a "reasonable" provision of surface properties is of decisive significance for the calculation.

An element of the present invention is that is was recognized that excessive demands, by way of illustration regarding the size of the distance part, impedes optimization of other surface properties if not prevents it. Thus the provision of surface properties as the function of the fundamental values, such as spherical power, the cylinder and the axial position of the atoric surface including the basis curve (surface power BK in the distance part) and/or the addition of the progressive surface are of decisive significance for quick and economical calculation of a multiplicity of progressive surfaces having a respective atoric surface.

DESCRIPTION OF THE INVENTION

The object of the present invention is to provide dimensioning principles for progressive ophthalmic lenses having an atoric surface by means of which these values can be set without much effort and without altering the "objective functions".

In accordance with a feature of the present invention, a second surface of the progressive ophthalmic lenses, which usually is the eye-facing surface is varied in power, but in individual cases, the front surface of the lens can be varied in power, and such feature permits achieving substantial "cosmetic advantages".

If an atoric surface having two symmetrical planes is selected as the eye-facing surface for a toric prescription, the basis curve of the progressive surfaces, i.e. the surface power in the distance reference point can be selected 1 dpt to 1.5 dpt "flatter" than for the spherical respectively toric eye-facing surface. Normally, a flatter basis curve would result in a distinct reduction in the visus and, in particular, a substantial limitation of the region suited for "distinct vision". However, actually by means of the selection, according to the present invention, of aspherical surfaces, with a "flatter basis curve" an extention of the regions suited for distinct vision can be obtained.

Preferable is if the design of the atoric surface varies dependent on the axial position of the cylinder. Atoric surface refers to a surface having at least one aspheric, thus deviating from the circular form, principal section is characterized by the deviation dz between the sagitta of the aspheric section or aspheric sections and a circle having a radius, which corresponds to the apex radius of the asphere, at least sectionwise, i.e., for specific regions of the distance from the apex is given by:

$$dz = a_j * r^2 + b_j * r^4$$

with dz standing for the deviation in $\mu$m between the apex circle and the principal section r standing for the distance from the apex in mm, i.e., $r=(x^2+y^2)^{0.5}$ and the coefficients being:

$$|a_j| \leq 2*10^{-4} \text{ mm}^{-1}$$

$$|b_j| \leq 1*10^{-6} \text{ mm}^{-3}$$

with j=1 standing for the principal section having the smaller apex curvature and j=2 standing for the larger apex curvature. The individual sections are joined twice in a continuously differentiable way in the manner of spline functions. With the coefficients $a_j$ and $b_j$ being yielded by the following functionals:

$$a_j = f_{j1}(sph, zyl) = a_{j1}(sph) + b_{j1}(sph)^* zyl$$

$$b_j = f_{j2}(sph, zyl) = a_{j2}(sph) + b_{j2}(sph)^* zyl$$

with sph standing for the spherical power in the distance reference point in the minus cylinder manner of notation zyl standing for the cylinder power in the distance reference point in the minus cylinder manner of notation and the coefficients $a_{j2}$ and $b_{j2}$ being a function of the second order of s.

The following can stand for the coefficients $a_{ji}$ and $b_{ji}$:

$$|a_{j1}| \leq 5*10^{-5} \text{ mm}^{-1}$$

$$|b_{j1}| \leq 5*10^{-2}$$

$$|a_{j2}| \leq 4*10^{-7} \text{ mm}^{-3}$$

$$|b_{j2}| \leq 3*10^{-4} \text{ mm}^{-2}$$

The coefficients $a_{j2}$ and $b_{j2}$ can be yielded by the following functionals:

$$a_{j2} = a_{h21} + b_{j21}^* s + c_{k21}^* s^2$$

$$b_{j2} = a_{j22} + b_{j22}^* s + c_{j22}^* s^2$$

the following can stand for the coefficients a, b and c:

$$a_{j21} = 2.35*10^{-8} \text{ mm}^{-3 \; ' b} \pm 50\%$$

$$b_{j21} = -1.7*10^{-5} \text{ mm}^{-2} \pm 50\%$$

$$c_{j21} = -8*10^{-3} \text{ mm}^{-1} \pm 50\%$$

The the coefficients for both principal sections permitting calculating an atoric rear surface for a progressive front surface in a simple manner are as follows:

$$a_{121} = 2.35*10^{-8} \text{ mm}^{-3} \pm 50\%$$

$$b_{j21} = -1.7*10^{-5} \text{ mm}^{-2} \pm 50\%$$

$$c_{j21} = -8*10^{-3} \text{ mm}^{-1} \pm 50\%$$

$$a_{122} = 1.73*10^{-5} \text{ mm}^{-2} \pm 50\%$$

$$b_{122} = 3.22*10^{-2} \text{ mm}^{-1} \pm 50\%$$

$$c_{122} = -2.27 \pm 50\%$$

$$a_{222} = -2.76*10^{-5} \text{ mm}^{-2} \pm 50\%$$

$$b_{222} = -1.29*10^{-3} \text{ mm}^{-1} \pm 50\%$$

$$c_{222} = -0.172 \pm 50\%$$

The present invention is characterized by the maximum height y (in mm) of the line, on which the surface astigmatism is 0.5 dpt and which limits downward the region suited for distinct vision of the distance part, on both sides at a distance of 25 mm from the principal line being:

$$y = f(Add, BK) = b(BK) + a/(Add*1000)$$

$$b(BK) = a_0 + a_1 * BK + a_2 * BK^2$$

The coefficients on the nasal and on the temporal side of the principal line of the progressive surface being set as follows:

|  | nasal |  | temporal |  |
|---|---|---|---|---|
| a | $-8.5 \pm 20\%$ |  | $-7.5 \pm 20\%$ |  |
| $a_0$ | 18 . . . 19 | mm | 19 . . . 20 | mm |
| $a_1$ | $-3580 \pm 20\%$ | $mm^2$ | $-4520 \pm 20\%$ | $mm^2$ |
| $a_2$ | $390,000 \pm 20\%$ | $mm^3$ | $480,000 \pm 20\%$ | $mm^3$. |

In the region of the distance part, which is suited for distinct vision, the astigmatism, which is essentially determined in the region of the distance part by the surface astigmatism, notably, has to be less than 0.5 dpt, because otherwise the visus would be too strongly reduced.

In known ophthalmic lenses of the type on which the generic part of the present invention is based, in order to facilitate optimization of other values, such as the width of the near part and/or the width of the progression zone, compromises are made in limiting the distance part in the lateral lower region, which as an element of the present invention was recognized frequently determine the comfort properties of the respective progressive ophthalmic lens for the wearer, are not necessary:

It was notably discovered that the "0.5 dpt line" of the surface astigmatism in the lateral lower region of the distance part can be let run "flatter" than in the state of the art without having to make compromises in other values, such as the width of the progression zone or the width of the near part. By means of the invented dimensioning principle, one obtains dimensioning of the maximum distance part value usually over the entire, in any case however, over the normal power and addition region, which "just barely do not" impair the properties of the glass in the other regions. Normal power region refers to the region having a not too great plus power.

Within the scope of the present invention, a series of progressive ophthalmic lenses refers to a set of at least two progressive ophthalmic lenses which differ with regard to their power in the distance reference point and/or their addition (near addition). Usually, the progressive surface of the ophthalmic lenses of a set have a "topology similarity", although a topology similarity is a preferred property of a set, it is not an absolute necessity for at least two ophthalmic lenses forming a "set" in the sense of the present invention.

In a preferred further embodiment, the tolerances for the coefficients a, $a_1$, and $a_2$ are resticted to $\pm 5\%$. Furthermore, the coefficient $a_0$, on the nasal side can have a value of 18 and on the temporal side a value of 19.3. This selection of the coefficients permits improved optimization of the progressive surfaces having varying basis curve and/or addition.

In a further embodiment, the minimal width dx of the near part on the level of the near reference point obtainable by the optimization is only a function of the addition Add and surprisingly not of the surface power BK in the distance reference point. In agreement with the preceding explanation, it is presupposed that the near part is limited by the 0.5 dpt line of the surface astigmatism of the progressive surface.

The width of the near part is, almost exactly like the value of the distance part, a determining value for the acceptance of a progressive ophthalmic lens of the respective user. A wider near part permits, by way of illustration, browsing over several columns of a newspaper without moving the head.

In particular, the minimal width dx of the near part "on the level of the near reference point" is:

$$dx = b' + a'/(Add*1000)$$

with $$a' = 14.6 \pm 20\%$$

$$b' = 5...7 \text{ mm}$$

In agreement with the common definition, the near reference point refers to the point on the principal line in which the surface power of the progressive surface reaches the value (BK+Add).

Preferable for the design of the progressive surface and, in particular, the design of the near part is if the tolerance for the coefficient a' is ±5% and the coefficient b' has the value 6 mm.

In another embodiment of the present invention, the offset $x_0$ of the projection of the principal line in the x,y-plane is:

$$x_0 = b'' + a'' - a''/(1 + e^{c*(y+d)})$$

The coefficients are:

$$2 \leq a'' \leq 4.3 \text{ mm}$$

$$-0.03 \leq b'' \leq 0 \text{ mm}$$

$$-0.4 \leq c \leq -0.3 \text{ mm}$$

$$4.5 \leq d \leq 5.1 \text{ mm}$$

The coefficient a" can be a function of the addition Add and of the surface power BK in the distance reference point.
The coefficient a" can be:

$$a'' = *Add + \beta*BK + \Gamma$$

with the coefficients of the relationship described in the present invention being:

$$100 \leq \beta \leq 300 \text{ mm}^2$$

Add ≦2.5 dpt:

$$0 \leq \leq 200 \text{ mm}^2$$

$$1.3 \leq \Gamma \leq 2 \text{ mm}$$

Add>2.5 dpt $$800 \leq \leq 1100 \text{ mm}^2$$

$$0.7 \leq \Gamma \leq 0 \text{ mm}$$

In the invented series of ophthalmic lenses, the principal line can be a line with a, even if little, surface astigmatism. Preferable is however if the principal line has no surface astigmatism. An element of the present invention is notably that it was recognized that in contrast to the teachings of DE 30 16 935 C2, a progressive ophthalmic lens having a large distance part and a large near part as well as a wide progression zone can also and, in particular, be realized if the principal line (at least) in the region −18 mm<y≦12 mm is a so-called umbilical line.

Furthermore, according to the present invention it is preferred if the lines of equal surface power, contrary to the state of the art, end horizontally in the principal line. By this means, the seesaw phenomena, etc. experienced by the wearer when his eyes move horizontally is with certainty avoided. The horizontal ending of the lines of equal surface power in the principal line is yielded by the provision of an infinitesimal strip of a higher order on both sides of the principal line; for this reference is made to DE-A-43 37 369 and, in particular, the description of the calculation procedures there.

The horizontal ending of the lines of equal surface power results in a characteristic course of the horizontal radii difference. Horizontal radius refers to the radius value obtained by the intersection of the progressive surface and a horizontal plane y=const.. Horizontal radii difference now refers to the difference between the horizontal radius on the principal line at the point $x=x_0$, $y=y_0$ and the horizontal radius at the point $x=x_1$, $y=y_0$ of the progressive surface.

Due to the invented forced horizontal ending of the lines of equal power, the horizontal radii difference changes in the lower region of the distance part, i.e. for y values of 5 to 10 mm in a strip on both sides of the principal line with a one-sided expansion of about 3 to 8 mm in a relatively large gradient, whereas the change has a substantially smaller gradient outside this strip. On the other hand, in the progression zone and in the near part, the gradient of the horizontal radii difference is relatively small in this strip on both sides of the principal line.

In progressive ophthalmic lenses of the type on which the generic part of the independent claims is based, the progressive surface, i.e. the surface having a continuously varying surface power is usually, however not necessarily, the front surface.

BRIEF DESCRIPTION OF THE DRAWING

The present invention is made more apparent using preferred embodiments with reference to the accompanying drawing, depicting in:

FIGS. 1a to 1c the lines of the same surface astigmatism for opththalmic lenses having a surface power of 4 dpt in the distance reference point and a varying addition (1 dpt to 3 dpt), FIGS. 2a to 2c the lines of the same surface astigmatism for opththalmic lenses having a surface power of 5 dpt in the distance reference point and a varying addition, FIGS. 3a to 3c the lines of the same surface astigmatism for opththalmic lenses having a surface power of 6.5 dpt in the distance reference point and a varying addition, FIG. 4a the projection of the principal line in the x,y-plane for the principal lines having a varying addition and a surface power of 5 dpt in the distance reference point in order to explain the so-called $x_0$ offset.

DESCRIPTION OF PREFERRED EMBODIMENTS

Figure 1A:
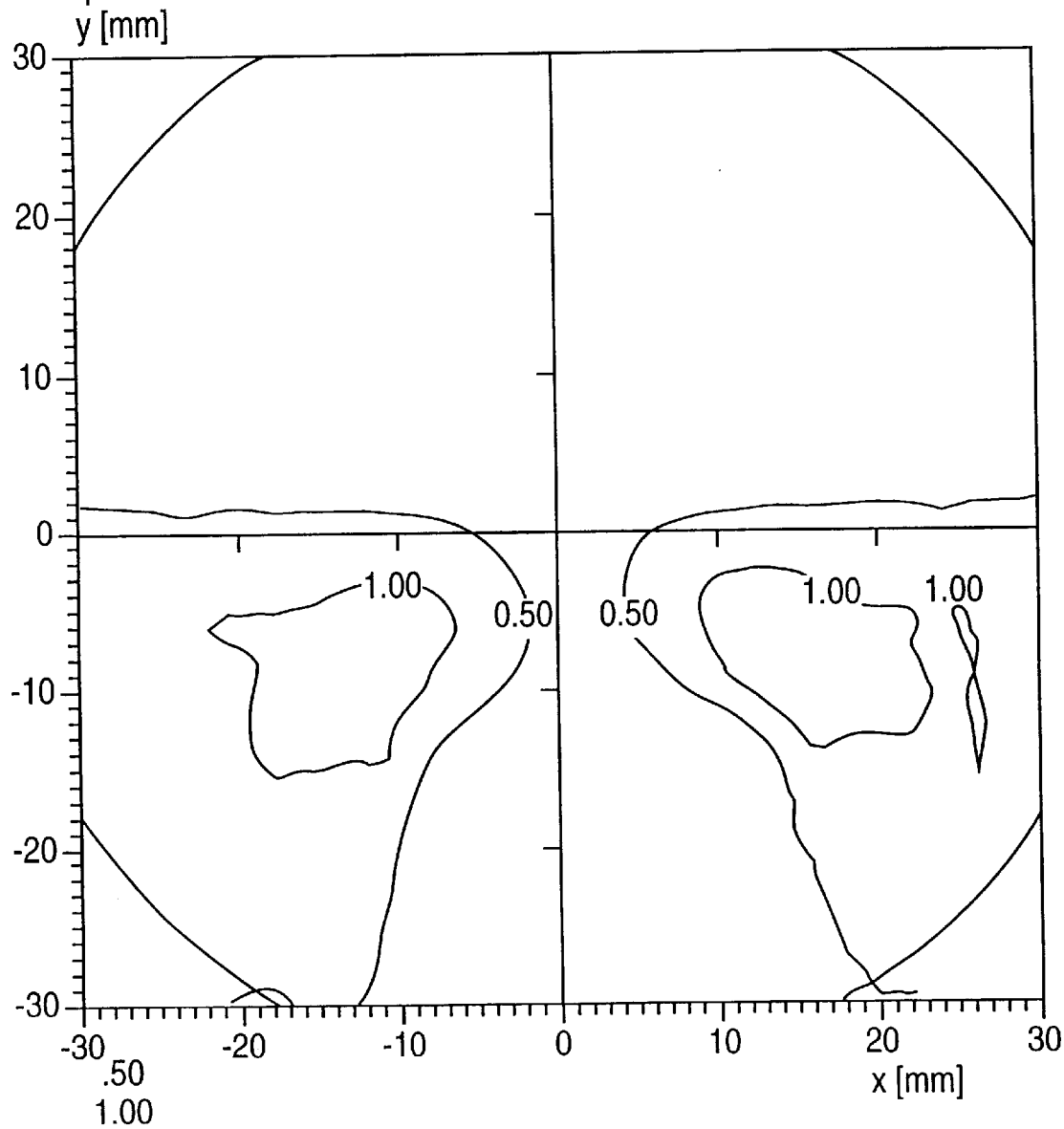
Figure 1B:
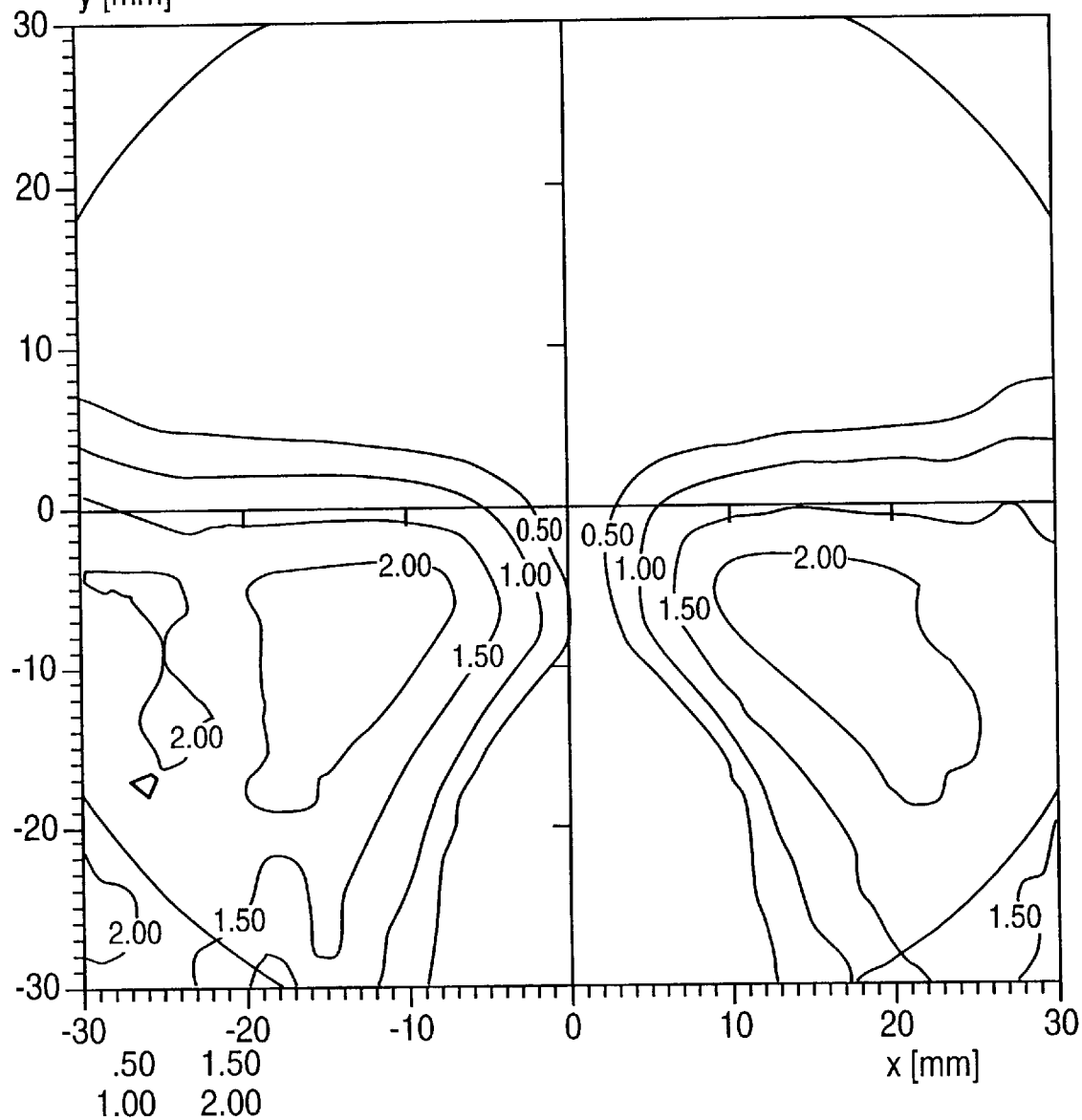
Figure 2A:
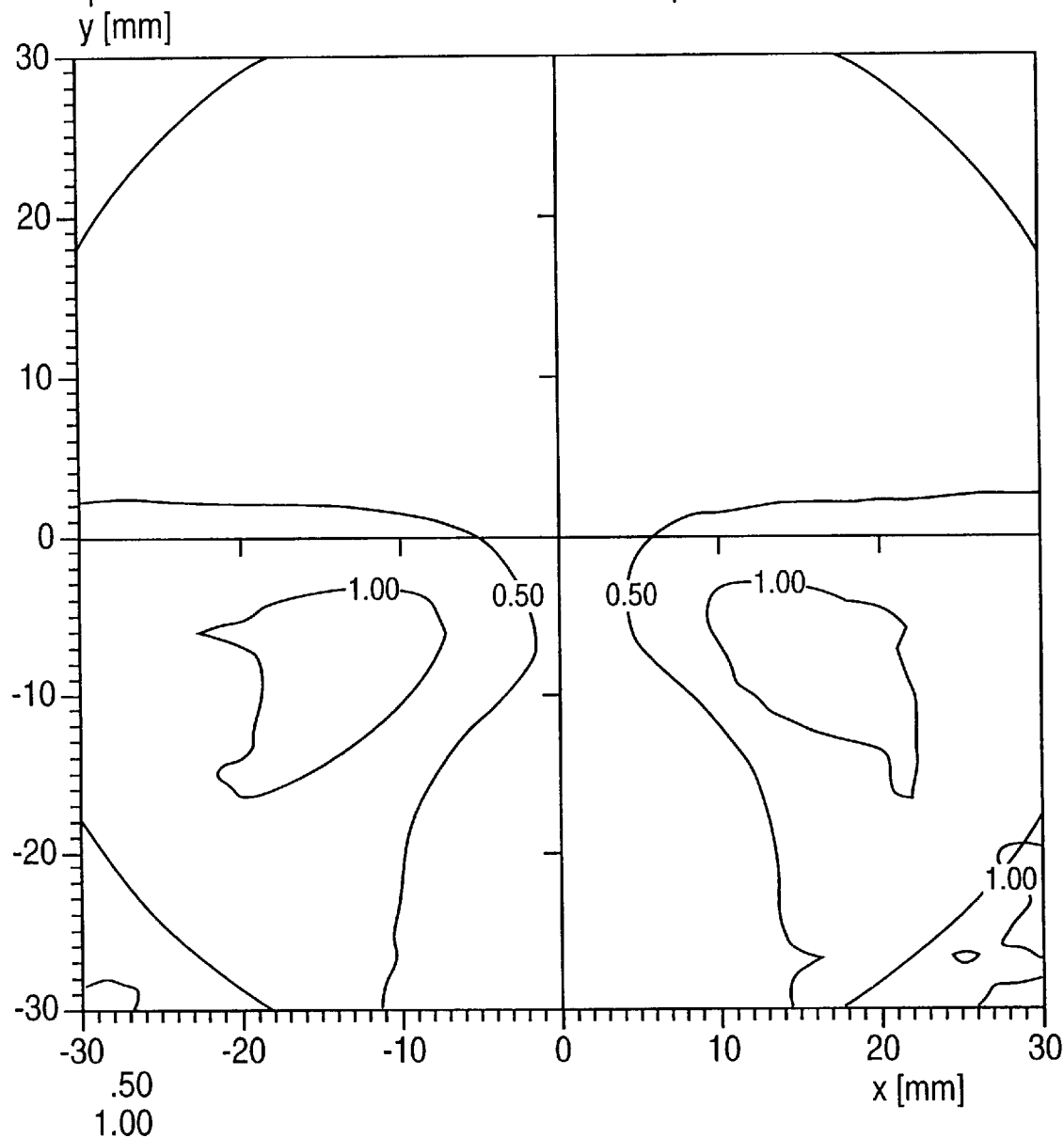
Figure 3A:
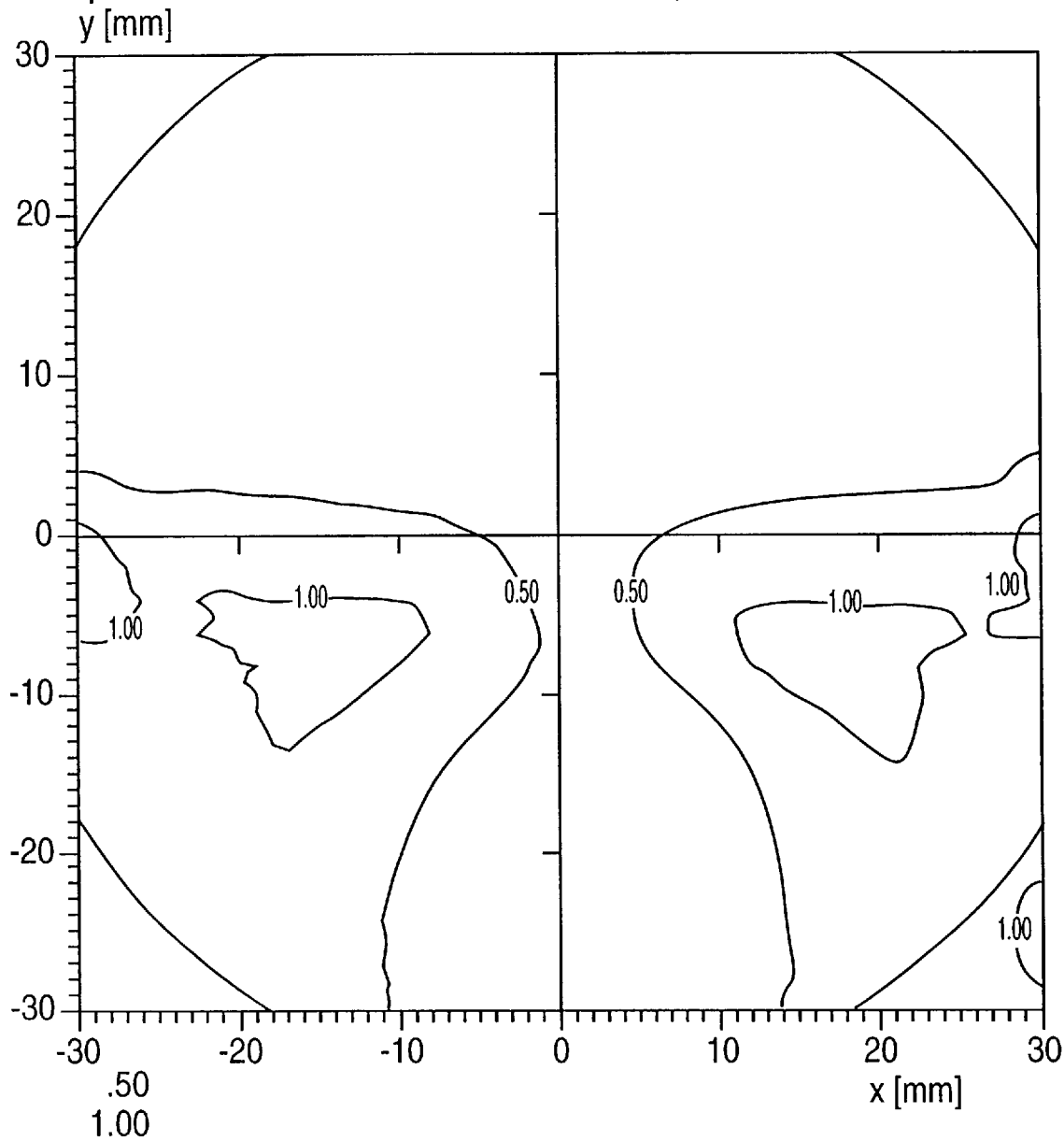
Figure 3B:
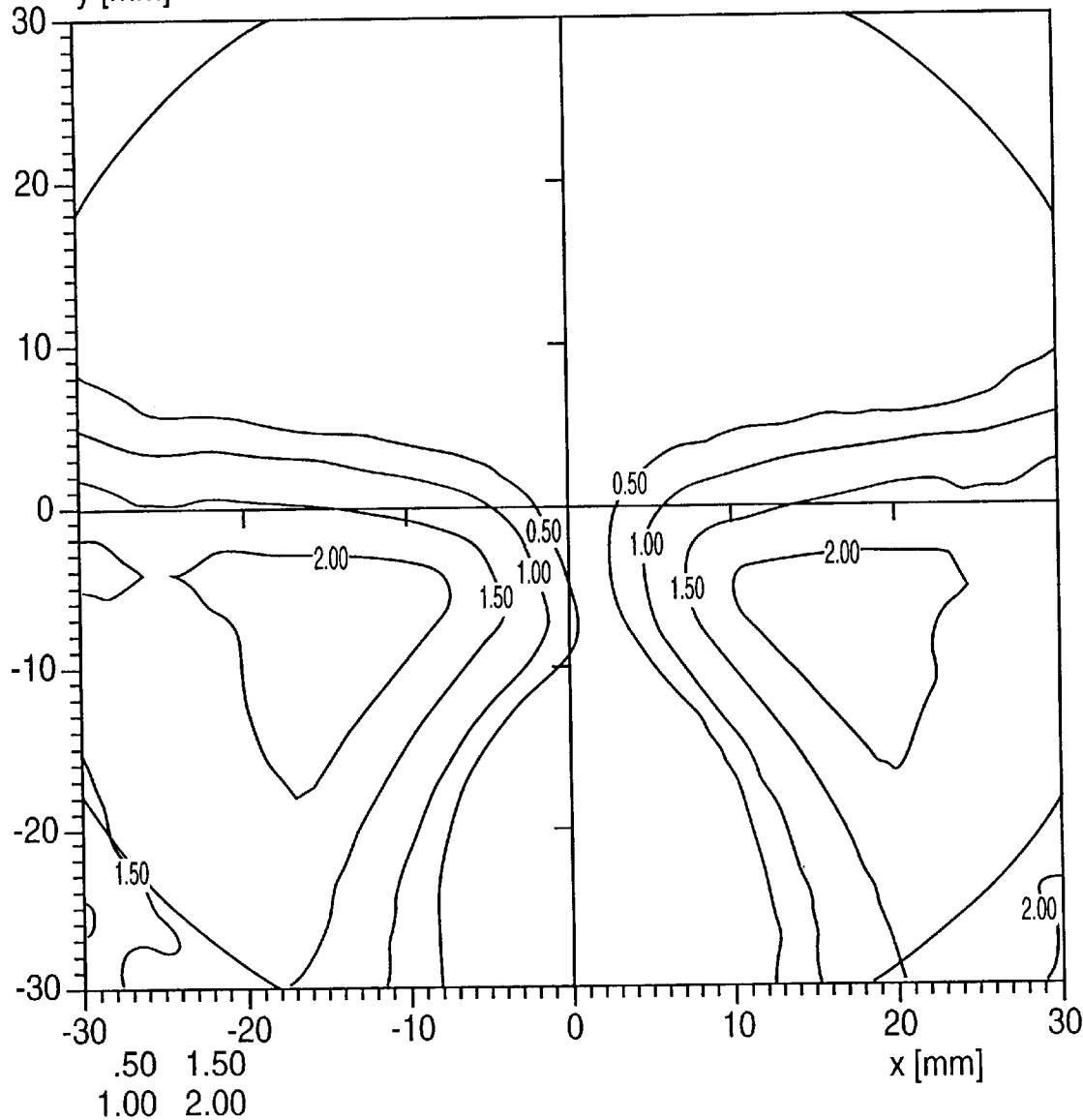
Figure 3C:
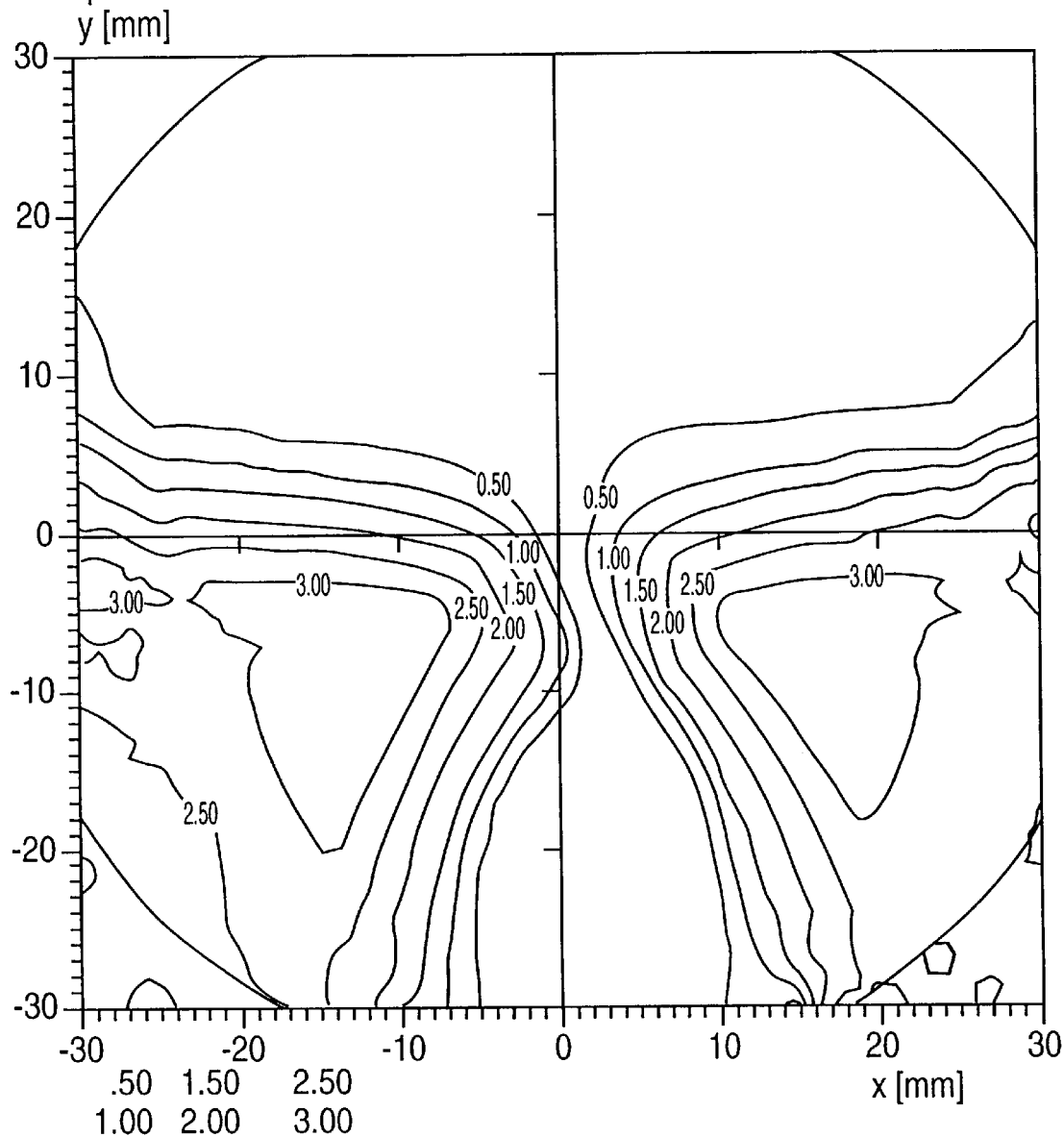

FIGS. 1 to 3 show the surface astigmatism (in dpt) for pregressive front surfaces like those employed in the invented ophthalmic lens as the function of the coordinates x and y (in mm) for a field of 60*60 mm, with the additional limitation of a typical "raw round" ophthalmic lens being plotted.

With regard to the definition of the surface astigmatism reference is made by way of illustration to U.S. Pat. No. 2,878,721.

The surfaces shown in the individual figures have the following "basic data".

|        | BK  | n     | Subarea | a     | b     | c     |
|--------|-----|-------|---------|-------|-------|-------|
| FIG. 1 | 4   | 1.604 | Add     | 1 dpt | 2 dpt | 3 dpt |
| FIG. 2 | 5   | 1.604 |         | 1     | 2     | 3     |
| FIG. 3 | 6.5 | 1.604 |         | 1     | 2     | 3     |

BK (in dpt) refers to the surface power, which the surface has in the so-called distance reference point having the coordinates x=0 mm, y=8 mm. In the distance reference point, the ophthalmic lens has suited power for seeing in the distance for the respective glasses wearer.

Typical spherical powers in the depicted ophthalmic lenses in the distance reference point can be, with the eye-facing surface being a toric surface having a "minus cylinder":

|        |           |
|--------|-----------|
| FIG. 1 | −2.5 dpt  |
| FIG. 2 | 0.5 dpt   |
| FIG. 3 | 3.25 dpt. |

Add (in dpt) refers to the addition, thus the increase of the surface power from the distance reference point to the so-called near reference point, in which the ophthalmic lens has power suited to seeing near. As can be seen in the preceding overview, the additions are 1 dpt, 2 dpt and 3 dpt.

FIGS. 1a to 3c show so-called iso-astigmatism lines for surface astigmatism values of 0.5 dpt, 1.0 dpt, 1.5 dpt, 2.0 dpt, 2.5 dpt and 3.0. If iso-astigmatism lines are missing for specific values in the individual figures, this signifies that the respective progressive surface has no regions in which the surface astigmatism reaches these values. Distinctly recognizable in the figures is the dependency of the height y of the line, on which the surface astigmatism is 0.5 dpt, at a distance of 25 mm of the principal line on the surface power value at the distance reference point and on the addition.

Furthermore, the FIGS. 1a to 3c show that the minimal width dx of the near part, particularly, at the level of the near reference point, defined in the usual manner, (primarily) is only a function of the addition Add. The dependency of the basis curve, i.e., on the surface power in the distance reference point, is however very much smaller!

Moreover, for the disclosure of all details not explained more closely herein reference is explicitly made to the accompanying figures.

Figure 4A:
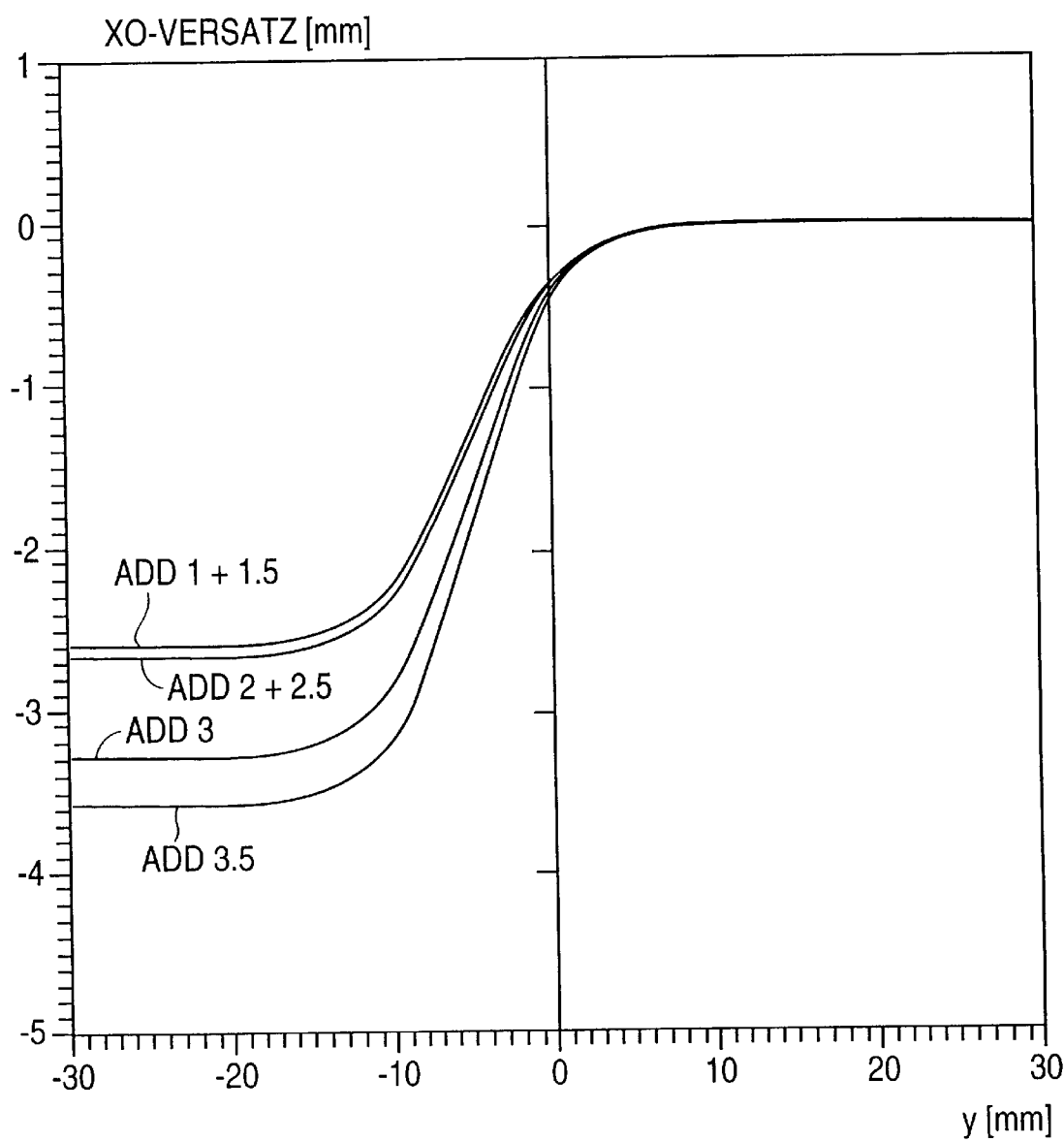
FIG. 4b the average surface power for these principal lines.
FIG. 4c the angle $\delta_0$ (y), i.e. the gradient of the horizontal sections at these principal lines, FIG. 5 the horizontal radii difference for an ophthalmic lens having a basis curve 5 and the addition 2 for varying values of y, FIGS. 6a to 6d the deviations of the atoric surfaces from the corresponding toric surfaces, FIGS. 7a and 7b the iso-visus lines for a progressive ophthalmic lens having an atoric eye-facing surface respectively a toric eye-facing surface, FIGS. 8a and 8b the sagitta deviations of two different atoric surfaces from the corresponding toric surfaces, and FIGS. 9a and 9b diagrams to explain the dependencies given according to the present invention.

FIG. 4a shows the projection of the principal line in the x,y plane for the principal lines having varying additions, notably 1.0 dpt, 1.5 dpt, 2.0 dpt, 2.5 dpt, 3.0 dpt and 3.5 dpt and a surface power of 5 dpt in the distance reference point. This figure explains the dependency, selected according to the present invention, of the so-called $x_0$ offset of the principal line, thus the offset by which the principal line follows the "vision beam" when lowering the glance. In other words the principal line follows the penetration point of the vision beam through the progressive surface when lowering a glance.

Figure 4B:
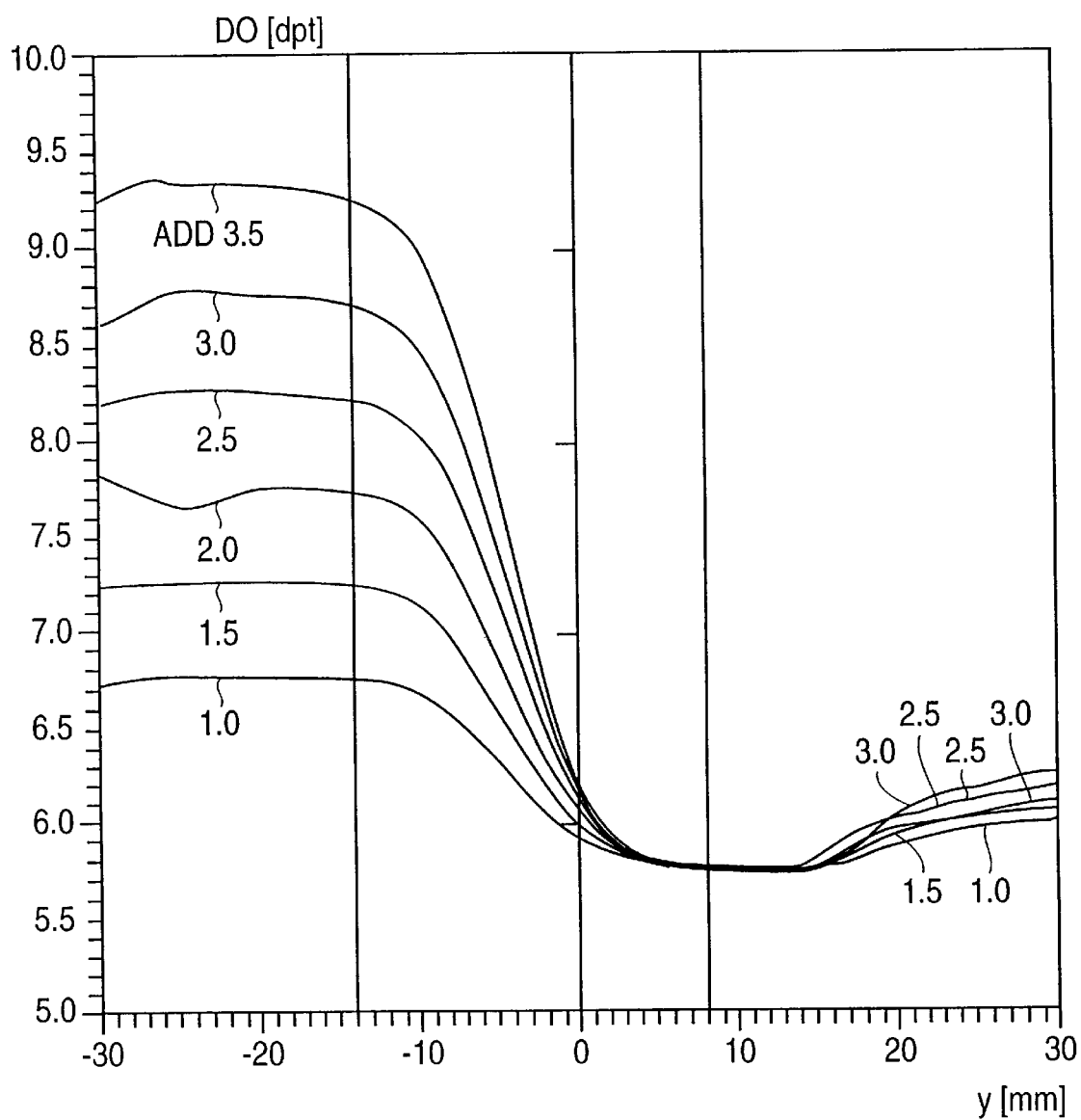
Figure 4C:
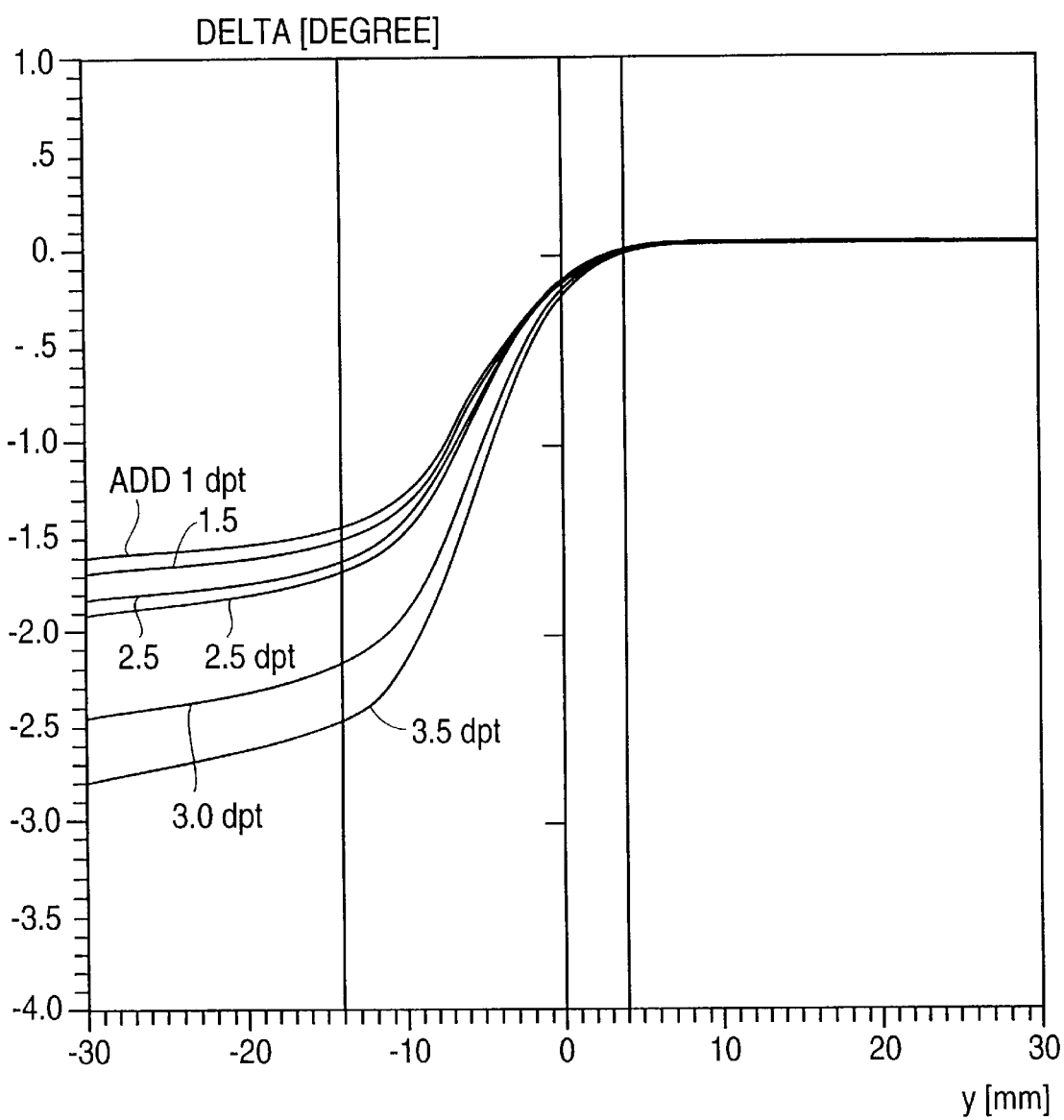

FIGS. 4b and 4c show the average surface power value respectively the angle $\delta_0$ (y), i.e. the gradient of the horizontal sections at these principal lines for the principal lines shown in FIG. 4a. Also regarding FIG. 4, for the disclosure of all the details not made more apparent reference is explicitly made to this figure.

Figure 5:
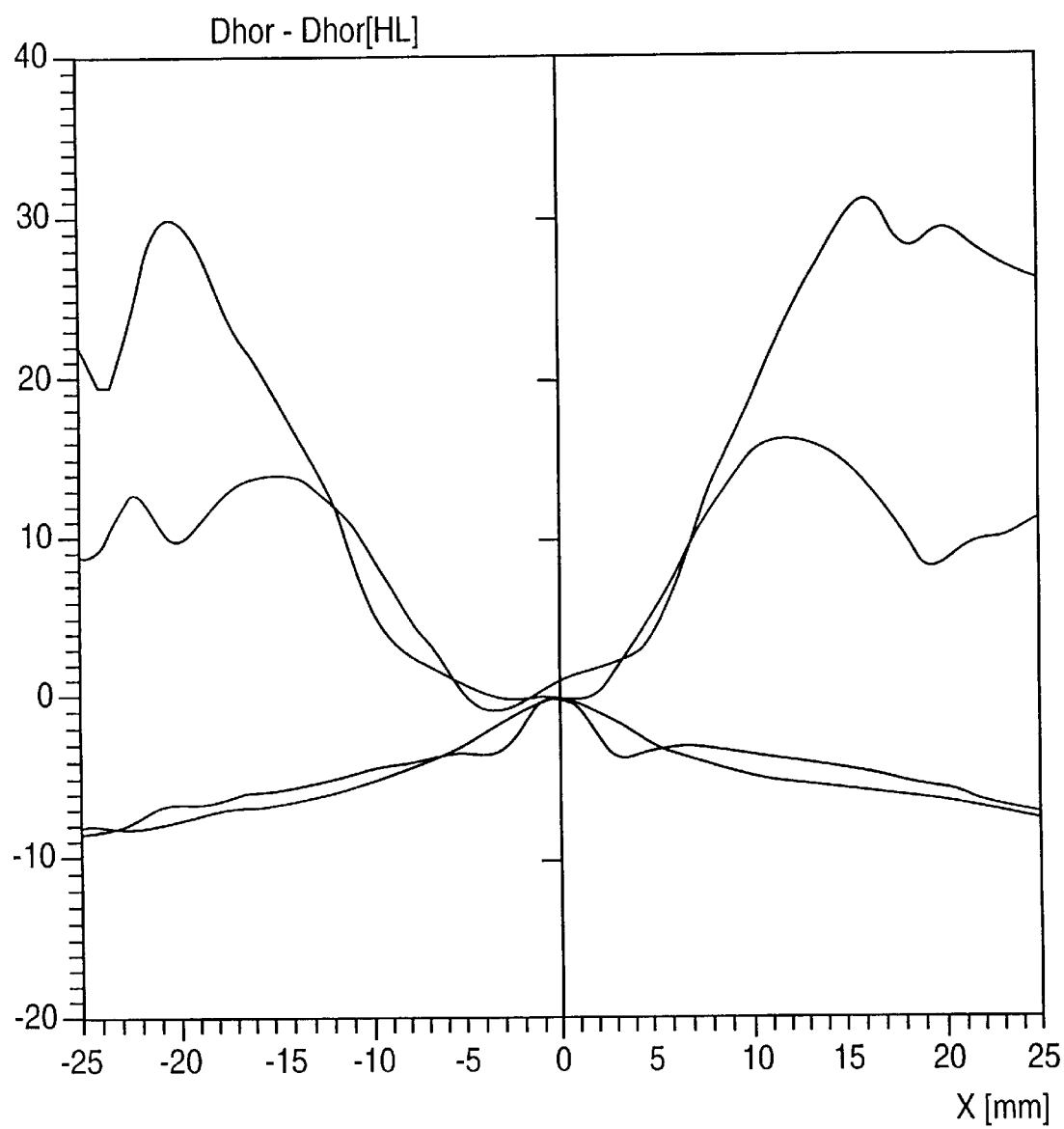

FIG. 5 shows the horizontal radii difference for different values of y, notably y=15 mm, 5 mm, −5 mm and −15 mm.

Horizontal radius refers to the radius value yielded by intersecting the progressive surface with a horizontal plane y=const., thus in the example y=15 mm, 5 mm, −5 mm and −15. Horizontal radii difference now refers to the difference between the horizontal radius on the principal line at the point $x=x_0$, $y=y_0$ and the horizontal radius at the point $x=x_1$, $y=y_0$ of the progressive surface. The respective point $x_0$ can be seen in FIG. 4a.

With the invented surfaces, in each case, in the lower region of the distance part, i.e. for y-values from 5 to 10 mm in a strip on both sides of the principal line having a one-sided expansion from about 3 to 8 mm, the horizontal radii difference changes with a relatively large gradient, whereas the change outside this strip has a substantially smaller gradient. On the other hand, in the progression zone (y=−5 mm) and in the near part (y=−15 mm) the gradient of the horizontal radii difference is relatively small in this strip on both sides of the principal line. However, the horizontal radii difference outside this strip in this region changes with a very large gradient and reaches a maximum at about x=12 to 20 mm.

After "running through" the maximum, the horizontal radii difference runs through a marked minimum which wanders "outward" with the sinking y values.

Due to this course of the horizontal radii difference, it is attained that the lines of equal surface power end horizontally in the principal line. In order to achieve this, it suffices to preset the horizontal radius as well as its gradient at the principal line.

A similar course of the horizontal radii difference is also obtained with other additions and basis curves obviating the representation of further additions and basis curves.

The preceding information permits someone skilled in the art to readily calculate the invented surfaces in a manner, thus by way of illustration as sagitta, suited for fabrication:

A function of the independent variables x and y, thus by way of illustration the surface astigmatisn Ast(x,y) and the knowledge of a strip of the 1st order along the principal line, suffices for a unequivocal description of a progressive surface. This strip of the first order is unequivocally determined by three one-dimensioned functions. These functions can, by way of illustration, be the projection of the principal line in the x,y-plane ($x_0$(y) offset), the projection of the principal line in the y,z-plane ($z_0$(y) offset), the average power H along the principal line, the angle $\delta_0$ (y), i.e. the gradient of the horizontal sections at the principal line. Furthermore, the sagitta $z_0$ and $z_0'$ with $z_0'=dz/dy$ have to be given at one site (e.g. y=0).

For the strip of the 1st order, the average power H is obviated, therefore a strip of the 2nd order is already determined.

The surface can now be determined, by means of illustration, by means of an objective function Z $$\text{minimum of } z = \int [(A(x,y) - A_v(x,y))^2 + (H(x_0(y),y) - H_v(y))^2 + \delta_0(8)^2 + z_0(0)^2 + z'_0(0)^2] \delta x dy.$$

In this case the index v signifies that it is a preset value.

As already mentioned in the invented series of progressive ophthalmic lenses, for a toric prescription the eye-facing surface is an atoric surface, with the basis curve of the progressive surface being selected 1 dpt to 1.5 dpt "flatter" than for the spherical respectively the toric eye-facing surface.

The "aberrations" in the use position caused by the "flatter basis curve" are corrected by means of the atoric surface.

FIG. 6 shows the deviations in μm of an atoric surface, which is required for the just mentioned correction of the aberrations, of a spheric surface "nestling" to the atoric surface at the apex, which thus has circular principal sections having a radius corresponding to the apex radius of the aspheric principal sections of the atoric surface. All the shown atoric surfaces have been calculated for lenses having a refractive index of 1.604.

Figure 6A:
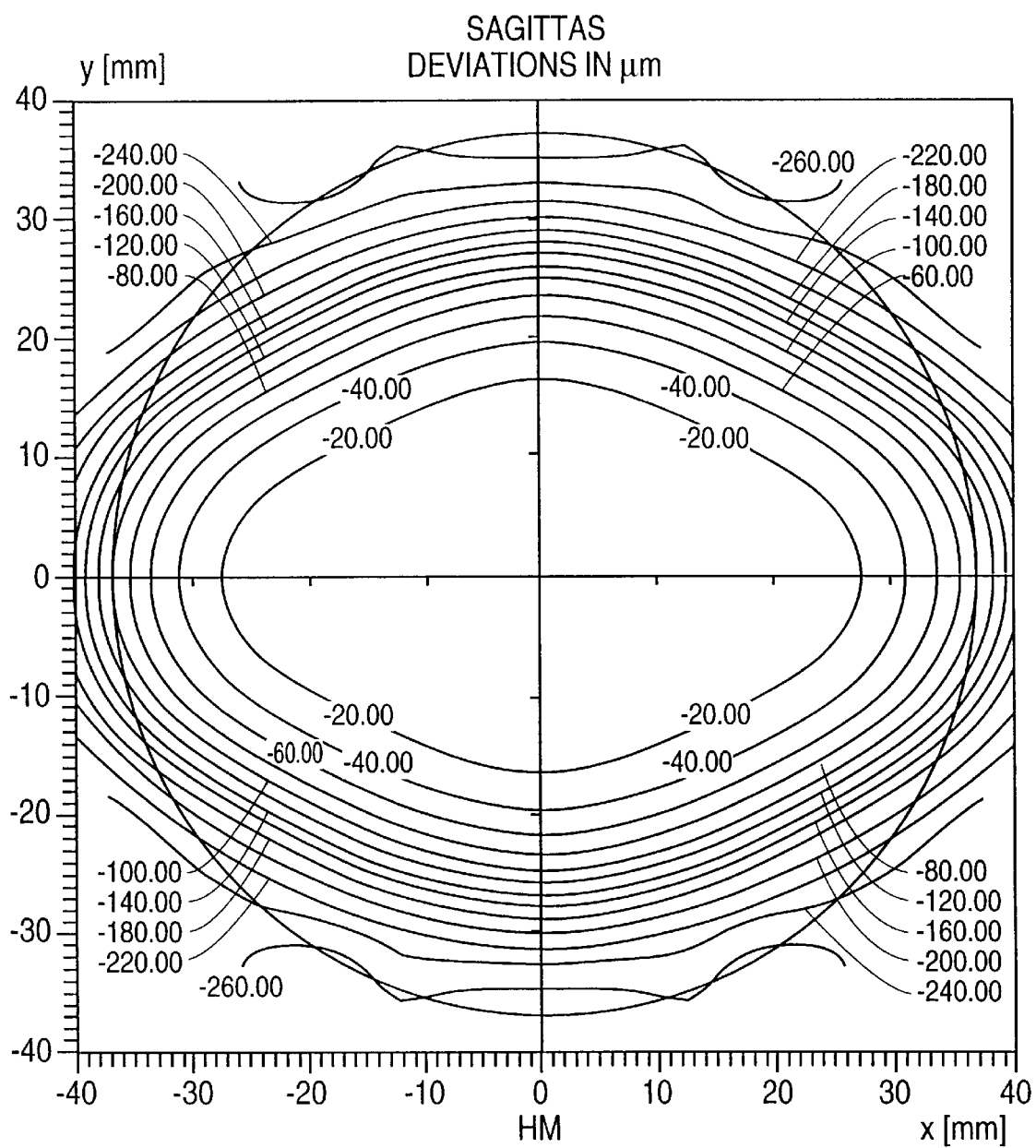
Figure 6B:
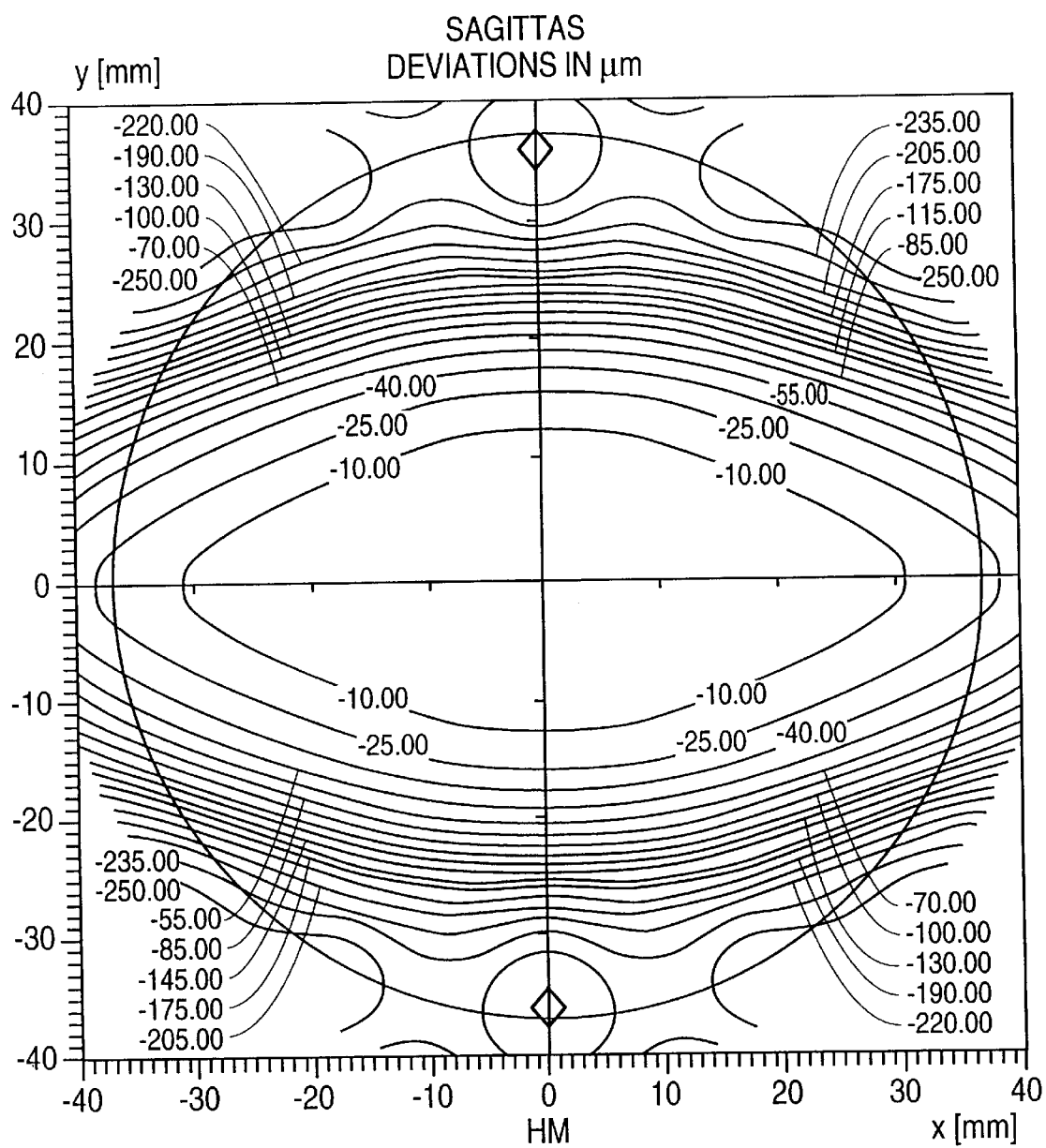
Figure 6C:
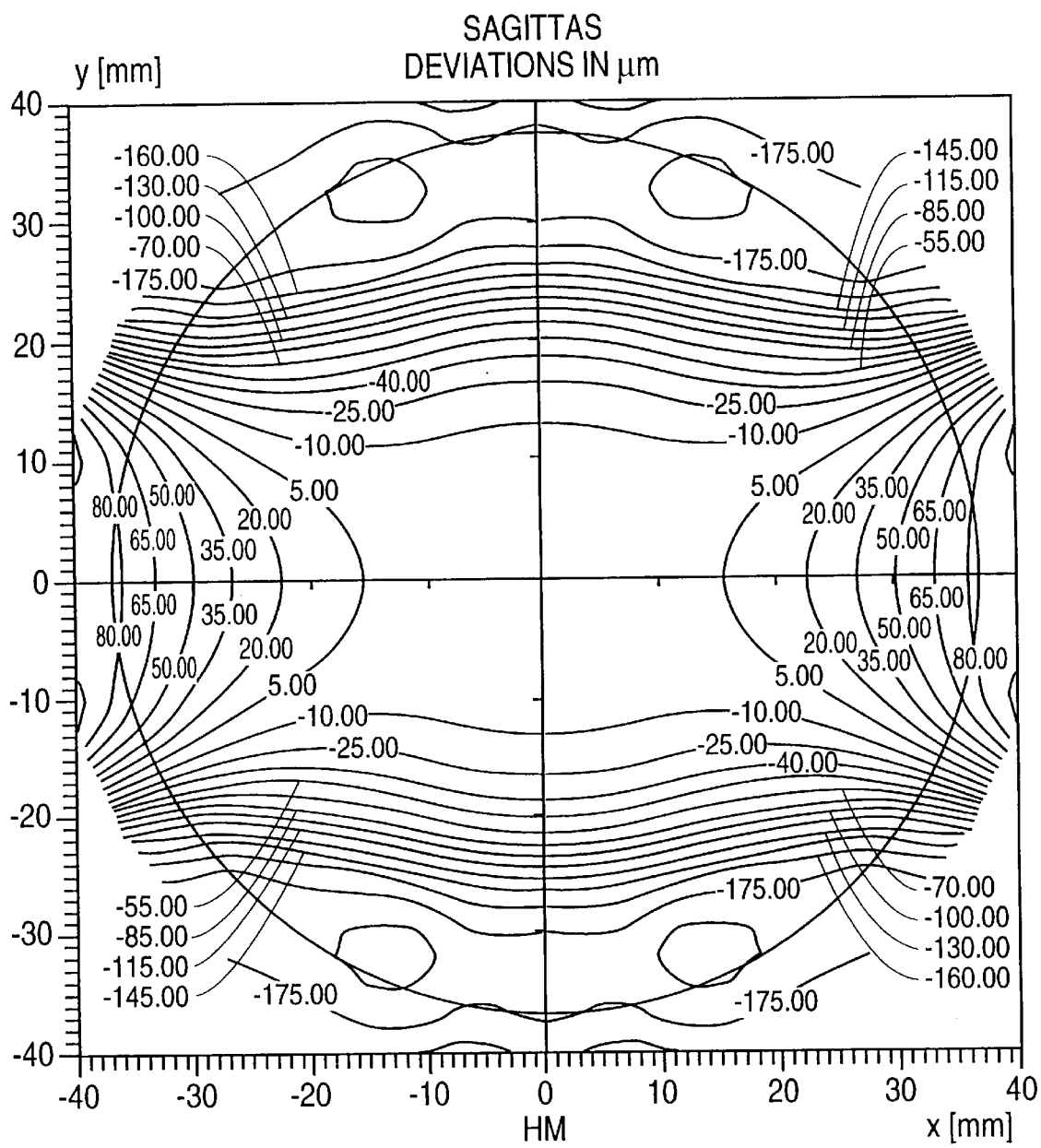

|  | spherical power | minus cylinder | axial position |
|---|---|---|---|
| FIG. 6a | 4.0 dpt | 2.25 dpt | 30° |
| FIG. 6b | 4.0 dpt | 2.25 | 80° |
| FIG. 6c | 4.0 dpt | 2.25 | 110° |
| FIG. 6d | 4.0 dpt | 2.25 | 150° |

The data relate to the principal sections of the atoric surfaces. The dependency on the axial position is not as significant as the dependency, discovered according to the present invention, on the spherical power (power of the "stronger" principal section) and on the minus cylinder (the difference in power between the stronger and the weaker principal section).

FIGS. 7a and 7b show the iso-visus lines for a progressive ophthalmic lens having an atoric eye-facing surface (7a) and having a toric eye-facing surface (7b).

In both lenses, the power of the distance part is 4 dpt, the addition 2 dpt and the cylinder 1 dpt. The axial position is 0°. The basis curve of the lens depicted in FIG. 1a, however, is 1.5 dpt "flatter". It can be distinctly seen that with the same visual performance, the progressive ophthalmic lens having an atoric eye-facing surface is cosmetically more favorable.

Figure 8B:
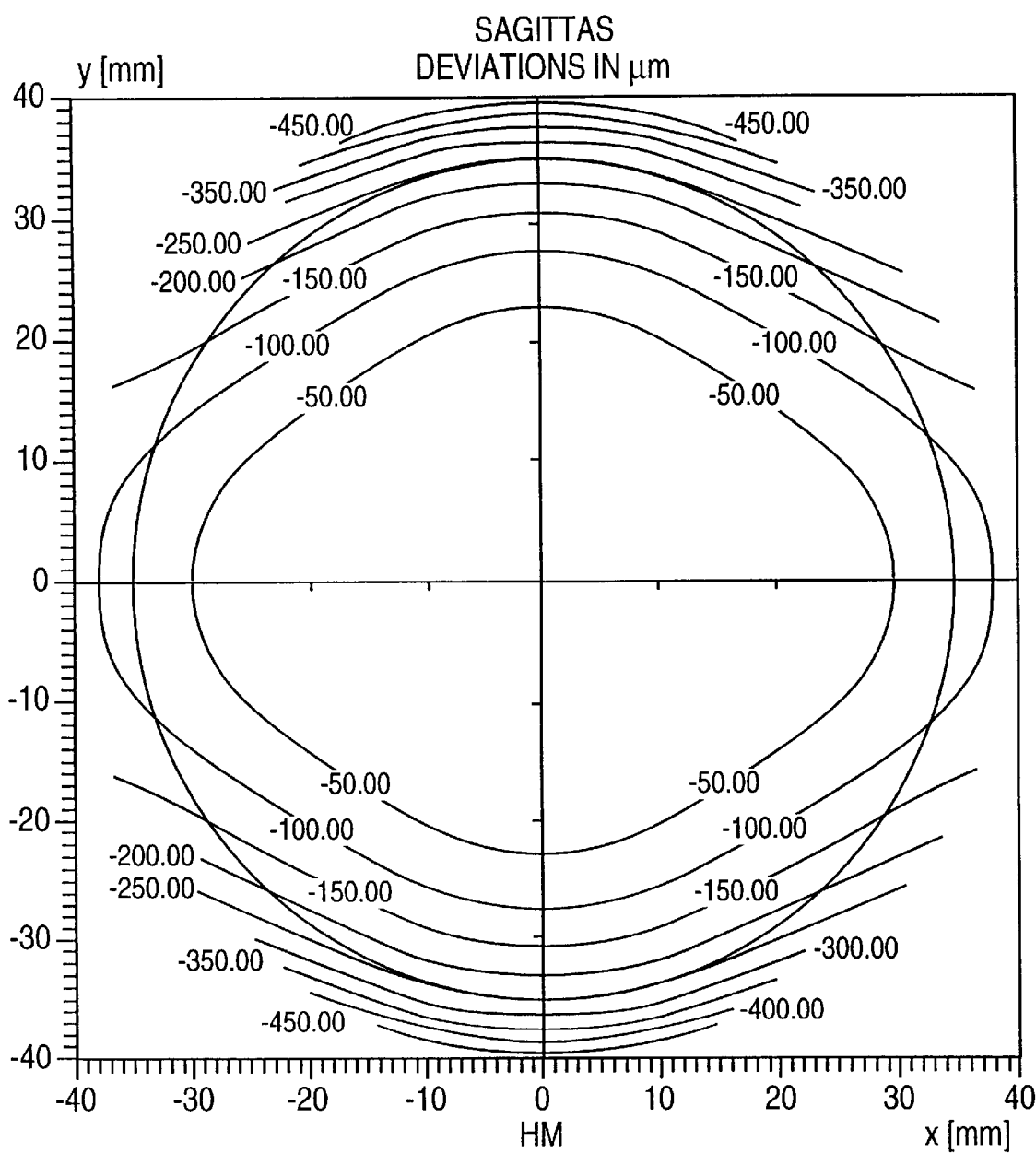

FIGS. 8a and 8b show the deviations of the sagittas of the invented atoric surfaces from the corresponding toric surfaces in μm. FIG. 8a shows a surface that has a spherical power of +2.0 dpt and an astigmatic power of −3.0 dpt, whereas FIG. 8b has a surface with a spherical power of +2.0 dpt and an astigmatic power of −1.0.

Figure 9B:
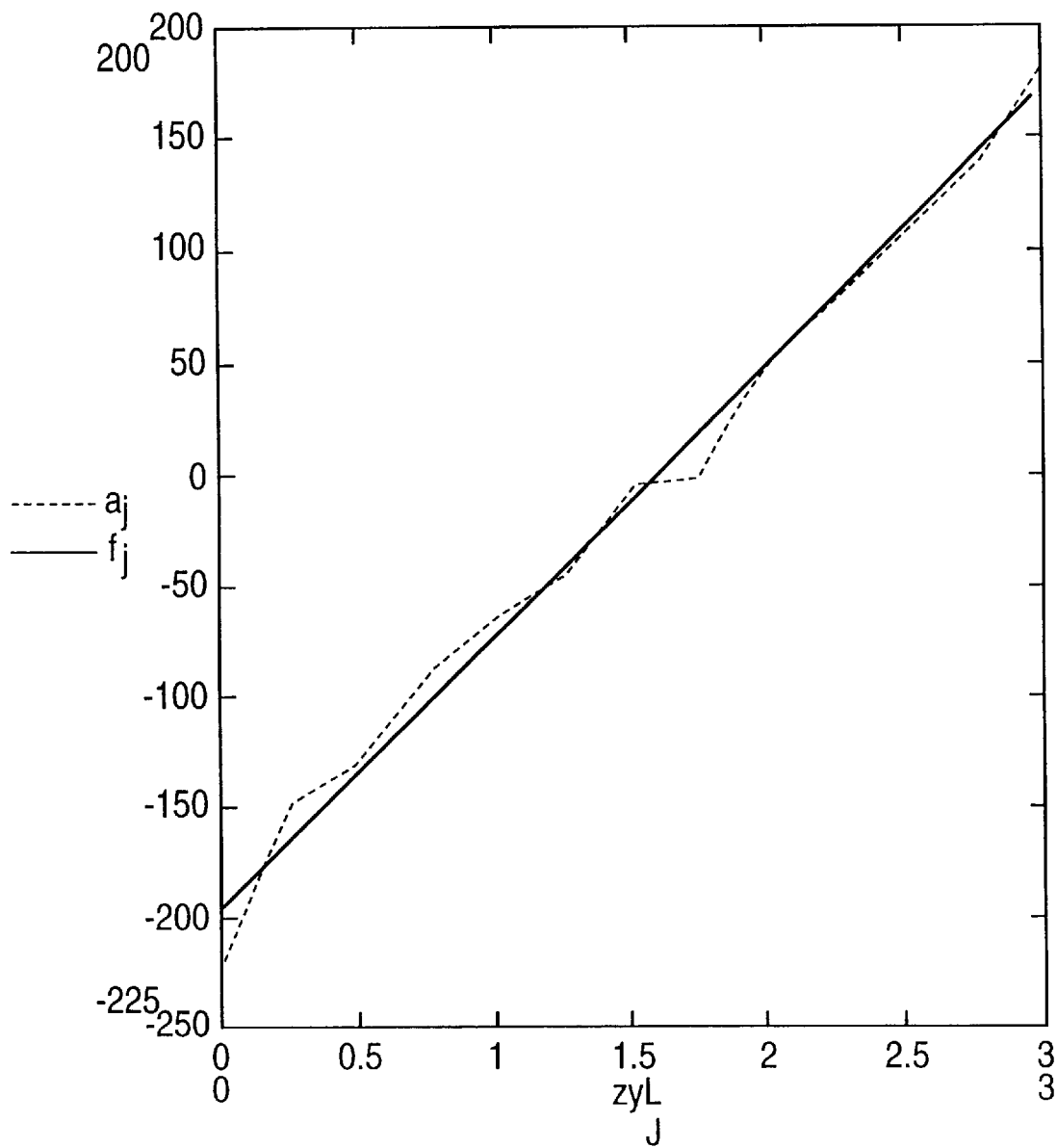

FIG. 9a and 9b explain the functionals set forth in claim 1. FIG. 9a shows two curves, notably the actual deviation δz (tat) compared with the theoretical deviation dz (theor) given by the described function. As one can see, the deviation, by way of illustration calculated by means of spline functions can be described covering the entire distance range using the simple invented relationship.

FIG. 9b explains the dependencies of the coefficients $a_j$ respectively $b_j$ of the cylindrical respectively astigmatic power in the distance reference point in minus cylinder notation. The cylindrical power is plotted on the abscissa and the coefficient respectively the function value is plotted on the ordinate.

The straight line indicates the invented relationship, whereas the partially continuous line shows the actual dependency. In the selected example, the spherical power is +5.0 dpt. The coefficient a is given by way of illustration.

To sum up, the difference in sagittas for each principal section and each combination of spherical power and "cylinder" is described by a function according to claim 1. The parameters a and b depend again linearly on the cylinder value, whereas the coefficent indicating the gradient depends linearly on the spherical power. The coefficient indicating the point of intersection of the straight line and the ordinate depends quadratically on the spherical power. Thus the difference in sagittas can be described using 20 parameters for each principal section.

What is claimed is:

1. A series of progressive ophthalmic lenses, in which the individual ophthalmic lenses of said series have a distance part, a near part, and at least one of a varying surface power in said distance part and a varying increase in surface power from said distance part to said near part being an addition Add, and of which each lens in said series is provided with:

a surface and in particular a front surface having a continuously varying surface power which rises from a respective value BK in diopter suited for seeing in the distance at a distance reference point BF having the coordinates x=0 mm, y=8 mm in the lower region of the distance part along a curved line being a principle line, which approximately coincides with a principal line of vision when lowering the glance, to a value suited for seeing near in an upper region of the near part, which is higher by a value of an addition Add in diopter than said surface power value BK in a lower region of the distance part, and a surface and in particular an eye-facing surface, the principal sections of which have varying power and of which at least one deviates from a circular form, characterized by a deviation dz between a sagitta of each section deviating from the circular form, and a circle having a radius, which corresponds to an apex radius of a respective principal section, at least sectionwise, wherein dz for specific regions of a distance from the apex is given by:

$$dz = a_j \cdot r^2 + b_j \cdot r^4$$

with dz standing for the deviation between the apex circle and the principal section r standing for the distance from the apex by the coefficients being:

$$|a_j| < 2 \cdot 10^{-4} \text{ mm}^{-1}$$

$$|b_j| < 1 \cdot 10^{-6} \text{ mm}^{-3}$$

with j=1 standing for the principal section having the smaller apex curvature and j=2 standing for the greater apex curvature, and by said coefficients $a_j$ and $b_j$ being yielded by the following functionals:

$$a_j = f_{j1}(sph, zyl) = a_{j1}(sph) + b_{j1}(sph) \cdot zyl$$

$$b_j = f_{j2}(sph, zyl) = a_{j2}(sph) + b_{j2}(sph) \cdot zyl$$

with sph standing for the spherical power in the distance reference point in the minus cylinder manner of notation zyl standing for the cylinder power in the distance reference point in the minus cylinder manner of notation, and by said coefficients $a_{j2}$ and $b_{j2}$ being a function of a second order.

2. A series according to claim 1, characterized by said coefficients $a_{ji}$ and $b_{ji}$ being:

$$|a_{j1}| \leq 5*10^{-5} \text{ mm}^{-1}$$

$$|b_{j1}| \leq 5*10^{-2}$$

$$|a_{j2}| \leq 4*10^{-7} \text{ mm}^{-3}$$

$$|b_{j2}| \leq 3*10^{-4} \text{ mm}^{-2}.$$

3. A series according to claim 1, characterized by a maximum height y of a line, on which a surface astigmatism of a progressive surface is 0.5 dpt and which limits downward a region suited for distinct vision of the distance part, on both a nasal and temporal side at a distance of 25 mm from the principal line being:

$$y=f(Add,BK)=b(BK)+a/(Add*1000)$$

$$b(BK)=a_0+a_1*BK+a_2*BK^2$$

and coefficients on the nasal and on the temporal side of the principal line of the progressive surface being:

|       | nasal              | temporal            |
|-------|--------------------|--------------------|
| a     | −8.5 + 20%         | −7.5 + 20%         |
| $a_0$ | 18 . . . 19 mm     | 19 . . . 20 mm     |
| $a_1$ | −3580 + 20% mm$^2$ | −4520 + 20% mm$^2$ |
| $a_2$ | 390,000 + 20% mm$^3$ | 480,000 + 20% mm$^3$. |

4. A series according to claim 3, characterized by the tolerances for said coefficients a, $a_1$ and $a_2$ being ±5%.

5. A series according to claim 3 or 4, characterized by said coefficient $a_0$ on the nasal side having a value of 18 mm and on the temporal side a value of 19.3 mm.

6. A series according to claim 3, characterized by a minimal width dx of the near part being only a function of the addition Add.

7. A series according to claim 6, characterized by said minimal width dx of the near part on the level of a near reference point being:

$$dx=b'+a'/(Add*1000)$$

with a' and b' being coefficients wherein $$a'=14.6\pm20\%$$

$$b'=5.7 \text{ mm}.$$

8. A series according to claim 7, characterized by a tolerance for said coefficient a' being ±5% and said coefficient b' having the value 6 mm.

9. A series according to claim 3, characterized by an offset $X_0$ of the projection of the principal line in the x,y-plane being:

$$X_0=b''+a''-a''/(1+e^{c*(y+d)})$$

and b'', a'', c and d being coefficients wherein:

$$2 \leq a'' \leq 4.3 \text{ mm}$$

$$-0.03 \leq b'' \leq 0 \text{ mm}$$

$$-0.4 \leq c \leq -0.3 \text{ mm}$$

$$4.5 \leq d \leq 5.1 \text{ mm}.$$

10. A series according to claim 9, characterized by said coefficient a'' being a function of said addition Add and of said surface power BK of the distance part.

11. A series according to claim 10, characterized by being valid:

$$a''=*Add+\beta*BK+\Gamma$$

with Bond $\Gamma$ coefficients wherein:

$$100 \leq \beta \leq 300 \text{ mm}^2$$

Add $\leq$ 2.5 dpt $$0 \leq \leq 200 \text{ mm}^2$$

$$1.3 \leq \Gamma \leq 2 \text{ mm}$$

Add>2.5 dpt $$800 \leq \leq 1100 \text{ mm}^2$$

$$0.7 \leq \Gamma \leq 0 \text{ mm}.$$

12. A series according to claim 3, characterized by a surface astigmatism on the principal line being zero at least in the region −18 mm<y$\leq$12 mm.

13. A series according to claim 3, characterized by lines of equal surface power value ending horizontally in the principal line.

14. A series according to claim 1, characterized by a base curve of the progressive surface being selected 1 dpt to 1.5 dpt "flatter" than for a toric eye-facing surface.

\* \* \* \* \*